United States Patent
Edren et al.

(10) Patent No.: US 11,814,042 B1
(45) Date of Patent: Nov. 14, 2023

(54) REDUCING HYDRAULIC FLUID PRESSURE BASED ON PREDICTED COLLISION

(71) Applicant: Zoox, Inc., Foster City, CA (US)

(72) Inventors: Johannes Edren, Belmont, CA (US); Markus Jost, San Mateo, CA (US); Ahditya Melkote, Foster City, CA (US); Amanda Brown Prescott, Half Moon Bay, CA (US)

(73) Assignee: Zoox, Inc., Foster City, CA (US)

( * ) Notice: Subject to any disclaimer, the term of this patent is extended or adjusted under 35 U.S.C. 154(b) by 273 days.

(21) Appl. No.: 17/117,015

(22) Filed: Dec. 9, 2020

(51) Int. Cl.
*B60W 30/09* (2012.01)
*B60G 17/019* (2006.01)
*G08G 1/16* (2006.01)

(52) U.S. Cl.
CPC ....... *B60W 30/09* (2013.01); *B60G 17/01941* (2013.01); *G08G 1/166* (2013.01); *B60G 2202/154* (2013.01); *B60G 2202/413* (2013.01)

(58) Field of Classification Search
CPC .......... B60W 30/085; B60W 30/0956; B60W 10/22; B60W 40/12; B60W 2554/4042; B60W 2554/80; B60W 30/09; B60G 2202/413
See application file for complete search history.

(56) References Cited

U.S. PATENT DOCUMENTS

| | | | |
|---|---|---|---|
| 8,892,304 B2 | 11/2014 | Lu et al. | |
| 9,415,658 B1 | 8/2016 | Makkar et al. | |
| 9,630,619 B1 | 4/2017 | Kentley et al. | |
| 9,676,244 B2 * | 6/2017 | Giovanardi | F16K 31/12 |
| 10,486,485 B1 | 11/2019 | Levinson et al. | |
| 10,543,838 B2 | 1/2020 | Kentley-Klay et al. | |
| 10,745,003 B2 | 8/2020 | Kentley-Klay et al. | |
| 2014/0265169 A1 * | 9/2014 | Giovanardi | B60G 17/016 280/5.5 |
| 2015/0224845 A1 | 8/2015 | Anderson et al. | |
| 2016/0185328 A1 * | 6/2016 | Hattori | B60T 8/17558 701/70 |
| 2016/0207530 A1 | 7/2016 | Stanek et al. | |
| 2016/0297430 A1 | 10/2016 | Jones et al. | |
| 2017/0066449 A1 * | 3/2017 | Lee | B60G 17/02 |
| 2017/0113745 A1 | 4/2017 | Cook et al. | |
| 2017/0137023 A1 * | 5/2017 | Anderson | B60G 17/02 |

(Continued)

FOREIGN PATENT DOCUMENTS

WO WO-2019197813 A1 * 10/2019 ............. B33Y 80/00

OTHER PUBLICATIONS

Office Action for U.S. Appl. No. 17/117,022, dated May 24, 2022, Edren, "Adjusting Vehicle Ride Height Based on Predicted Collision", 17 Pages.

*Primary Examiner* — Peter D Nolan
*Assistant Examiner* — Tarek Elarabi
(74) *Attorney, Agent, or Firm* — Lee & Hayes, P.C.

(57) ABSTRACT

A vehicle may receive sensor data captured by a sensor, determine that the sensor data represents an object in the environment, and determine a collision probability associated with a collision between the vehicle and the object. Based at least in part on the collision probability, the vehicle may determine one or more mitigating actions to perform prior to, during, and/or after the collision. The mitigating action may be associated with adjusting a hydraulic fluid pressure in at least a portion of a hydraulic fluid system of the vehicle.

20 Claims, 6 Drawing Sheets

(56) References Cited

U.S. PATENT DOCUMENTS

2018/0281548 A1   10/2018  Bailey
2019/0344784 A1*  11/2019  You ...................... B60W 10/20
2019/0381998 A1*  12/2019  Anderson ............. B60W 10/20

* cited by examiner

REDUCING HYDRAULIC FLUID PRESSURE BASED ON PREDICTED COLLISION

BACKGROUND

Safety is an important consideration in the design and construction of vehicles. In some instances, vehicles may have systems that help detect potential collisions to alert a driver or, in the case of an autonomous vehicle, to attempt to perform maneuvers to avoid the collision.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
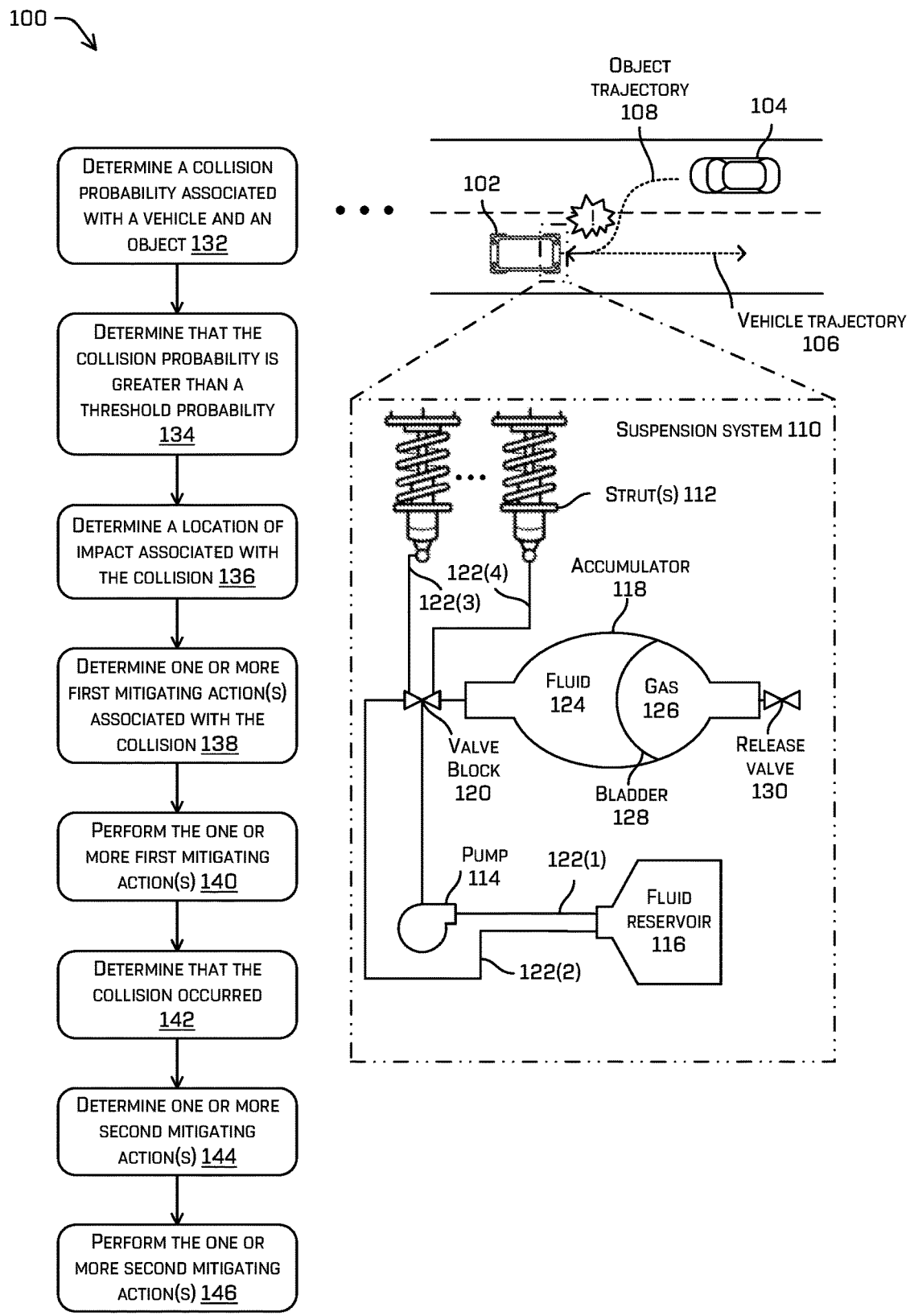
FIG. 1 is a pictorial flow diagram of an example process for determining a collision probability associated with a vehicle and causing a reduction in hydraulic fluid pressure within a suspension system.

As discussed above, vehicles may detect potential collisions to alert a driver or, in the case of an autonomous vehicle, to attempt to perform maneuvers to avoid the collision. This application describes techniques and systems for performing mitigating action(s) before, during, and/or in the event of a collision. In some examples, a vehicle, such as an autonomous vehicle, may detect a potential collision and perform one or more mitigating action. The mitigating action(s) may include actions that, when performed, attempt to avoid the collision and/or otherwise increase the safety of occupant(s) of the vehicle, the object, bystanders, and so forth. Further, the vehicle may take additional mitigating action(s) in the event of a collision for additional safety. Accordingly, mitigating action(s) may be performed based on actual collision(s) and/or predicted collision(s). By way of example and not limitation, mitigating actions may include reducing a hydraulic fluid pressure in a hydraulic system of the vehicle and/or adjusting a ride height of the vehicle. These and other mitigating actions are described further throughout this application.

In some instances, the vehicle may include a safety system that determines a collision probability based on sensor data received by one or more sensors of the vehicle. The sensor data may include data associated with the vehicle and/or one or more objects. For example, the sensor data may include information associated with physical characteristics, a location, and/or a movement associated with the vehicle and the object(s). Additional information associated with the object(s) may be determined based on the sensor data, such as a position, a velocity, an acceleration, a direction, a size, a shape, a type of the object, etc. Based on the sensor data, the safety system may determine trajectories of the vehicle and/or the object for use in determining the collision probability. Generally, the collision probability may represent a likelihood, or risk, of the collision occurring.

In most circumstances, the vehicle will be able to maneuver to safely avoid the collision. However, in instances where avoidance is impossible and the collision probability is greater than a threshold probability, the safety system may determine that a collision is imminent (e.g., within a certain amount of time). Based on this determination, the safety system may communicate with other system(s) of the vehicle for performing mitigating action(s). In some instances, these mitigating action(s) may be performed prior to a collision (e.g., pre-collision), during a collision, and/or after a collision (e.g., post-collision). For mitigating action(s) performed prior to the collision, the safety system may communicate with systems of the vehicle in advance and with enough time to permit performance of the mitigating action(s).

In some instances, the mitigating action(s) may include braking, bracing occupant(s) of the vehicle, deploying airbags, and so forth. In these instances, the safety system may instruct a braking system, bracing systems, airbag systems, etc. to perform certain action(s). Additionally, the mitigation action(s) may include depressurizing or reducing a hydraulic fluid pressure within hydraulic systems of the vehicle. For example, the vehicle may include a pressurized hydraulic system that provides active suspension of the vehicle. The suspension system may include one or more struts, pumps, fluid reservoirs, accumulators, hydraulic lines, actuators, controllers, valves, etc. The suspension system, or other similar hydraulic pressurized systems of the vehicle, may pose safety concerns in the event of a collision. For example, in the event of a collision, components of the suspension system may rupture. This may cause hydraulic fluid to leak or spray the object and/or the environment. That is, if components of the suspension system rupture, the high-pressure nature of the suspension system may cause hydraulic fluid to spray or aerosolize. This poses safety concerns, for example, if the aerosolized hydraulic fluid contacts hot surfaces (e.g., exhaust, catalytic converters, etc.). Reducing hydraulic fluid spray, or an amount of hydraulic fluid aerosolized, may increase the safety of the vehicle, the object, occupant(s) of the vehicle, bystanders, and so forth.

In the event that the safety system determines that a collision is imminent or likely to occur, the safety system may instruct the suspension system to reduce a pressure of the hydraulic fluid. For example, the safety system may communicate with the suspension system to depressurize hydraulic lines, struts, accumulator, and so forth. In such instances, the suspension system may turn off a hydraulic pump and/or actuate one or more valves to permit hydraulic fluid to drain into a hydraulic fluid reservoir or tank. In such instances, the high pressure hydraulic fluid may empty into a low pressure reservoir. This purging of high pressure may, in some instances, affect a ride height of the vehicle. For example, given that the hydraulic lines and struts are depressurized, the vehicle may sag or slump under gravity and weight of the vehicle.

In some instances, the ride height of the vehicle may be measured between a ground surface of a roadway on which the vehicle travels to a top surface of the vehicle. Alternatively, the ride height may be determined using an extended or actuated length of the strut(s) of the suspension system and/or other component(s) of the suspension system. In some instances, however, the ride height may be relative to a position or height of occupants within the vehicle, such as a height of an occupant seating surface above the ground surface. Additionally, the ride height may not be uniform across the vehicle, and the vehicle may include different rolls and depending on how the suspension system is adjusted.

In some instances, rather than depressurizing the suspension system, selective components of the suspension system may be depressurized. For example, an accumulator of the suspension system may drain hydraulic fluid into the reservoir. That is, the suspension system may actuate selective valves for depressurizing the accumulator. Depressurizing the accumulator, as compared to an entirety of the suspension system, may not affect the ride height of the vehicle and/or cause the vehicle to sag. However, depressurizing the accumulator and/or components fluidly connected to the accumulator may still reduce hydraulic fluid pressure thereby reducing the possibility of hydraulic fluid spray and aerosolization as a result of rupture of the system.

Additionally or alternatively, in the event of a predicted collision, the safety system may determine an angle, orientation, and/or direction of impact. For example, the safety system may determine a direction or place of impact between the vehicle and the object (e.g., first end, second end, first side, second side, first corner, etc.). The safety system may also classify the object and/or determine an object type associated with the object (e.g., pedestrian, type of vehicle, bicycle, etc.). In some instances, the classification of the object may be based on the sensor data generated by the sensor(s). For example, the sensor(s) may determine a height, size, volume, and/or movement of the object. In some instances, the direction of impact and/or the classification of the object may be used for vertically adjusting a ride height of the vehicle. Adjusting the ride height may increase the safety of the occupant(s) of the vehicle and/or the object. For example, in the event that the direction of impact between the vehicle and the object is on a side of the vehicle, the safety system may instruct the suspension system to adjust (e.g., raise or lower) a ride height. Whether the suspension system lowers or raises in ride height and/or a degree of raising or lowering may be based on a characteristic of the object, such as size, shape, speed, and/or object type of the object.

In some instances, the degree to which the vehicle is raised or lowered may be based at least in part on a height of a leading surface of the object. For example, if the object is a small vehicle with a lower bumper height, the suspension system may lower the vehicle. Lowering the vehicle may align or substantially align frames, bumpers, crash rails, and/or other energy absorbing structures of the vehicle with the object. Alternatively, if the object is a large vehicle with a higher bumper height, the suspension system may raise the vehicle. In a similar manner, raising the vehicle may align or substantially frames, bumpers, crash rails, and/or other energy absorbing structures of the vehicle with the object. The adjustment of the ride height, in some instances, may be accomplished by changing an extension of one or more struts, springs, and/or other component(s) of the suspension system and/or vertically adjusting an occupant seating surface.

In some instances, the strut(s) of the suspension system, or of multiple suspension system(s) on the vehicle, may be located at different ends or sides. Adjustment of the ride height may include actuating the strut(s) of the suspension system(s) to different or respective degrees. In such instances, ends or sides of the vehicle may be lowered or raised to different heights. This may change the roll or pitch of the vehicle.

Performance of the mitigating action(s) discussed herein so far may be reversable in the event that the collision does not occur. For example, even though the safety system determines that the collision probability is greater than a threshold and performs the mitigating action(s), the collision may be ultimately be avoided. In such instances, the sensor(s) may determine that the collision did not occur. After avoidance, the suspension system may be re-pressurized and the vehicle may resume traveling within the environment. However, in the event that a collision occurs, and the senor(s) determine an actual impact, additional mitigating action(s) may be performed. In some instances, the additional mitigating action(s) may include further depressurizing components of the suspension system, calling a remote teleoperations operator, enlisting the assistance of emergency services, depowering drive mechanisms of the vehicle, disconnecting a high-voltage battery, and so forth. The additional mitigation action(s) after collision may further limit the amount of aerosolized hydraulic fluid. For example, in the event of a collision, an accumulator may purge compressed gas (e.g., nitrogen) to quickly depressurize the accumulator and hydraulic fluid may flow into the accumulator. In doing so, a volume of the suspension system occupied by the hydraulic fluid may increase and a pressure of the hydraulic fluid within the suspension system may be reduced.

In some instances, the performance of the additional mitigation action(s) may be based on the deployment of additional system(s) of the vehicle. For example, deployment of vehicle airbags (or a signal indicative thereof) may be used as a trigger to cause a valve fluidly connected to the accumulator to release the compressed gas. Additionally or alternatively, collision may be detected by one or more other sensors of the vehicle (e.g., an accelerometer, inertial measurement unit, camera, lidar, tire pressure sensor, etc.) and the additional mitigation action(s) may be performed based at least in part on a signal from the one or more other sensors of the vehicle. The vehicle may include additional system(s), and/or redundant system(s), for carrying out the mitigating action(s) in the event of a collision. Additionally, although the above discussion relates to reducing pressure within a suspension system, the techniques and systems discussed herein may, in some examples, be applied to other pressurized system(s) that include pressurized hydraulic fluid (e.g., power steering systems, brake systems, transmissions, etc.). In such instances, limiting the amount of aerosolized hydraulic fluid, or other fluids, may prevent ignition or combustion of the fluid on hot surfaces (e.g., exhaust, brake rotors, etc.) and/or fluids leaking into the environment The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 is a pictorial flow diagram of an example process for determining a collision probability and performing one or more mitigating action(s) based at least in part on the collision probability and/or a collision occurring. In FIG. 1, an example environment 100 is shown that includes a vehicle 102 and an object 104 traversing the environment 100 (e.g. along a roadway). For example, the vehicle 102 may be travelling on a road and may be moving in a direction that is opposite (e.g., oncoming) to movement of the object 104 travelling on the road.

The vehicle 102 may have a vehicle trajectory 106, while the object 104 may be associated with an object trajectory 108. In some instances, the vehicle 102 may determine the vehicle trajectory 106 and/or the object trajectory 108. For example, the vehicle trajectory 106 and/or the object trajectory 108 may be determined based on sensor data received by one or more sensors on the vehicle 102. Examples of vehicle trajectories and object trajectories are discussed in, for example, U.S. patent application Ser. No. 16/151,607 titled "Trajectory Prediction On Top-Down Scenes" and filed Oct. 4, 2018, which is incorporated by reference herein in its entirety, and in, for example, U.S. patent application Ser. No. 15/843,512 titled "Trajectory Generation Using Curvature Segments" and filed Dec. 15, 2017, which is incorporated by reference herein in its entirety.

The vehicle 102 may include a suspension system 110 located on longitudinal ends (e.g., front, back, first end, second end, etc.) of the vehicle 102. For example, as shown in FIG. 1, the front of the vehicle 102 (i.e., in a direction of travel) may include the suspension system 110. However, the vehicle 102 may include an additional suspension system located at the rear of the vehicle 102. In such instances, the suspension systems of the vehicle 102 may be independently operable and each suspension system may include separate modules, controller(s), sensor(s), strut(s), pump(s), valve(s), etc. Additionally, although the discussion herein relates to the suspension system 110 at the front of the vehicle 102, it is to be understood that the suspension system at the rear of the vehicle 102 may include similar components and/or function similarly.

The suspension system 110 may represent a hydraulic circuit that includes various components, including, but not limited to strut(s) 112, a pump 114, a fluid reservoir 116, an accumulator 118, and a valve block 120, which may include various valves (e.g., pressure valves, temperature valves, etc.). The suspension system 110 may include additional components for carrying out an operation of the suspension system 110, such as manifolds, check valves, and so forth. The strut(s) 112, pump 114, fluid reservoir 116, accumulator 118, and/or the valve block 120 may fluidly connect to one another via hydraulic lines 122(1)-(4), for example. Although four hydraulic lines are shown, it is to be understood that the suspension system 110 may include additional hydraulic lines.

The accumulator 118 may represent is a pressure storage reservoir or vessel in which hydraulic fluid 124 is held under pressure by the pump 114. As shown, the accumulator 118 may have a first portion including the hydraulic fluid 124 and a second portion including a pressurized gas 126 (e.g., nitrogen). A bladder 128 may fluidly separate the first portion and the second port. The accumulator 118 acts as an energy storage device such that when the hydraulic fluid 124 flows into the accumulator 118, the gas 126 is compressed and the bladder 128 deviates to accommodate for the increased hydraulic fluid 124. Comparatively, when the hydraulic fluid 124 pressure drops (e.g., during extending of the strut(s) 112), the gas 126 expands and pushes the stored hydraulic fluid 124 out of the accumulator 118 and into the strut(s) 112, for example. The suspension system 110 or the accumulator 118 is further shown including a release valve 130 fluidly connected to the second portion of the accumulator for discharging or releasing the gas 126 within the accumulator 118, as discussed herein. The suspension system 110 may also include controller(s), module(s), sensor(s) and/or other components for carrying out operation(s) of the suspension system 110. For example, the controller(s) may cause valve(s) to open, close, control a pressure of the hydraulic fluid, 124, supply power to the pump 114, and so forth.

Turning to the flow diagram in FIG. 1, an operation 132 may include determining a collision probability associated with the vehicle 102 and the object 104. In some instances, the collision probability may be determined based on a predicted intersection between the vehicle 102 and the object 104. The predicted intersection may be associated with a predicted location of the vehicle 102 and the predicted location of the object 104 at a future instance in time. As discussed in detail herein, the vehicle 102 may include one or more system(s), such as a safety system, that determines the collision probability based on sensor data received by sensor(s) of the vehicle 102. The sensor data may include data associated with the vehicle 102 and the object 104, such as information associated with physical characteristics, a location, and/or a movement associated with the vehicle 102 and the object 104. Based on the sensor data, as well as the vehicle trajectory 106 and/or the object trajectory 108, the safety system may determine the collision probability. The collision probability may represent a likelihood, or risk, of a collision between the vehicle 102 and the object 104. Additionally, in some instances, the safety system may determine whether the collision is imminent. Whether the collision is imminent may be based on predicting that the collision occurs within a certain amount of time (e.g., one second, two seconds, etc.).

In some instances, the vehicle 102 may filter those objects of interest within the environment to determine which objects are further processed. For example, the vehicle 102 may identify those objects with a highest probability of colliding or otherwise interfering with the vehicle 102 to devote more processing resources to the objects most likely to collide or otherwise interfere with the vehicle 012. Examples of identifying objects having different probabilities of interfering with the vehicle 102 and providing different levels of further processing for the objects are discussed in, for example, U.S. patent application Ser. No. 17/090,712 titled "Allocation of Safety System Resources Based on Probability of Intersection," filed Nov. 5, 2020, which is incorporated by reference herein in its entirety.

An operation 134 may include determining that the collision probability is greater than a threshold probability. As discussed herein, based on the collision probability being greater that the threshold probability, the vehicle 102 (e.g., the safety system) may undertake action(s) to mitigate the collision, reduce an effect of the collision, or to increase the safety of occupant(s) of the vehicle 102, occupant(s) of the object 104, bystanders, the environment, etc. For example, the mitigating action(s) may include depressurizing or reducing a pressure of the hydraulic fluid 124 in at least a portion of the suspension system 110. In the event of an actual collision, the reduction in pressure may reduce an amount of high pressure hydraulic fluid 124 sprayed or aerosolized into the environment. This may eliminate or reduce a risk of the hydraulic fluid 124 igniting or combusting on hot surfaces (e.g., exhaust).

An operation 136 may include determining a location of impact associated with the collision. For example, based on the vehicle trajectory 106 and/or the object trajectory 108, the vehicle 102 (e.g., the safety system) may determine a predicted location of the collision, a direction of impact, an angle of impact, and so forth. The location of the impact may affect which components of the suspension system 110, or which suspension system 110 of the vehicle 102 is depressurized. In the example shown in FIG. 1, for example, the location of impact may be on a front of the vehicle 102 (e.g., head-on collision). As such, the pressure of hydraulic fluid 124 of the suspension system 110 may be reduced.

An operation 138 may include determining one or more first mitigating action(s) associated with the collision. Introduced above, in some instances, the one or more first mitigating action(s) may include depressurizing or reducing a pressure in the suspension system 110 to limit or prevent the spray of hydraulic fluid 124. By way of example, the first mitigating action(s) may include the safety system instructing the suspension system 110 (e.g., a controller of the suspension system 110) to route high pressure hydraulic fluid from the strut(s) 112 to the fluid reservoir 116. In some instances, this may include depressurizing the accumulator 118, turning off the pump 114, and/or opening valve(s) to depressurize the strut(s) 112. In doing so, the hydraulic fluid pressure within the suspension system 110 may be reduced by emptying the hydraulic fluid 124 into the low pressure fluid reservoir 116. As part of this process, the suspension system 110 may instruct valve(s) to open and/or the pump(s) 114 to turn off. This allows the pressure of the hydraulic fluid 124 within the suspension system 110 to reduce and drain into the fluid reservoir 116.

In some instances, depressurizing the suspension system 110 may cause the vehicle 102 to sag or slump. That is, because the suspension system 110 is no longer pressurized, or experiences a reduction in hydraulic fluid pressure, the vehicle 102 may slump. In other words, the suspension system 110 may not have adequate hydraulic fluid pressure to uphold the weight of the vehicle 102. As a result, the ride height, angle, or orientation of the vehicle 102 may be adjusted based on the reduced hydraulic fluid pressure. However, in some instances, the effects of reducing the ride height of the vehicle 102 may be offset by reducing spraying of hydraulic fluid 124 in the event of a collision.

Additionally, or alternatively, the first mitigating action(s) may include depressurizing or reducing a pressure in certain components of the suspension system 110. For example, the hydraulic fluid pressure in the accumulator 118 may be reduced by opening one or more valves within the valve block 120. As shown, the valve block 120 may fluidly connect to the strut(s) 112, the fluid reservoir 116, and the accumulator 118. Opening one or more valves within the valve block 120 may route the hydraulic fluid 124 from the accumulator 118 to the fluid reservoir 116 (e.g., via the hydraulic line 122(2)). Emptying of the hydraulic fluid 124 in the accumulator 118 may reduce hydraulic fluid pressure in the accumulator 118 and/or other portions of the suspension system 110. Moreover, by selectively opening one or more valves within the valve block 120 and emptying the accumulator 118, the strut(s) 112 may still be pressurized. For example, the suspension system 110, or the valve block 120, may include valve(s) that prevent hydraulic fluid flow from the strut(s) 112 to the fluid reservoir 116. Depressurizing the accumulator 118, as compared to an entirety of the suspension system 110, may not affect the ride height of the vehicle 102 and/or cause the vehicle 102 to sag. However, the accumulator 118 and/or components of the suspension system 110 fluidly connected to the accumulator 118 may have reduced hydraulic fluid pressure for reducing hydraulic fluid spray.

Additionally, or alternatively, the first mitigating action(s) may include opening the release valve 130 and allowing the pressurized gas 126 to evacuate the accumulator 118. By evacuating the pressurized gas 126, the hydraulic fluid pressure within the suspension system 110 may reduce. For example, evacuating the pressurized gas 126 forces the bladder 128 to retract into the second portion and allows additional hydraulic fluid 124 to flow into the accumulator 118. In doing so, the hydraulic fluid 124 may occupy more space within the accumulator 118 and pressure may be reduced.

In some instances, the first mitigating action(s) selected for reducing the hydraulic pressure in the suspension system 110 may be based at least in part on the speed of the vehicle 102, the speed of the object 104, the impact direction, and/or a predicted time associated with the collision. For example, the first mitigating action(s) may be associated with response times or an amount of time the suspension system 110 takes to reduce hydraulic fluid pressure. In some instances, opening the release valve 130 may reduce the hydraulic fluid pressure in the suspension system 110 the fastest given that the flow rate of the pressurized gas 126 may be greater than the flow rate of hydraulic fluid 124 back to the fluid reservoir 116. Selectively reducing the hydraulic fluid pressure by opening one or more valves within the valve block 120 may reduce the hydraulic fluid pressure slower than opening the release valve 130, but faster than depressurizing the suspension system 110. For example, the amount of electrical current required to open one or more valves within the valve block 120 may be less than the amount of electrical current to open other valve(s) in the entire suspension system 110. Additionally, opening one or more valve(s) within the valve block 120, as compared to a plurality of valves for the suspension system 110, may increase a responsiveness in reducing hydraulic fluid pressure.

Additionally, or alternatively, in some instances, the first mitigating action(s) may include adjusting a height (e.g., extension) of the strut(s) 112 or the vehicle 102. For example, adjusting the height of the strut(s) 112 may better align frames, bumpers, or other safety rails of the vehicle 102 with that of the object 104. Initially, determining whether to adjust the height of the vehicle 102 may include characterizing or classifying the object 104. Characterizing or classifying the object 104 may include determining a type of object 104 (e.g., car, truck, bus, etc.), a ride height of the object 104 (e.g., distance off a ground surface, height above or below occupants in the vehicle 102, etc.), a bumper height of the object 104, a height of a leading surface of the object 104, and so forth. By way of example, if the object 104 is a larger vehicle, such as a truck with a higher ride height, the first mitigating action(s) may include raising a height of the vehicle 102. This may align a frame of the vehicle 102 to that of the object 104 in order to increase the safety of the occupant(s) in the vehicle 102 and/or occupant(s) in the object 104. Alternatively, if the object 104 is a smaller vehicle (e.g., car), the first mitigating action(s) may include lowering a height of the vehicle 102. This may align the frame of the vehicle 1020 to that of the object 104 in order to increase the safety of the occupant(s) in the vehicle 102 and/or occupant(s) in the object 104.

In some instances, the first mitigating action(s) may be determined based on a direction of impact. For example, in instances where the impact or collision is projected to occur at the front of the vehicle 102, the suspension system 110 at the front of the vehicle 102 may be depressurized. Moreover, in some instances, adjusting the ride height of the vehicle 102 may occur in instances where side collisions are predicted. As such, the determination of which first mitigating action(s) to perform may be based on the direction of impact and/or the location of the impact on the vehicle 102. However, other factors, such as speed or acceleration of the vehicle 102 and/or the object may be used when determining which first mitigating action(s) to perform.

An operation 140 may include performing the one or more first mitigating action(s). In some instances, the safety system may determine which first mitigating action(s) are to be performed and may coordinate their performance by transmitting instructions. For example, the instructions may be communicated to the suspension system 110 for depressurizing one or more component(s). In receipt of the instructions, the suspension system 110 may open valve(s), turn off the pump 114, and/or otherwise reduce hydraulic fluid pressure in the suspension system 110. Additionally, certain components of the suspension system 110 may be depressurized (e.g., accumulator 118) while other components remain pressurized (e.g., strut(s) 112). Similarly, the suspension system 110 may receive instructions to adjust in ride height based on a classification and/or characteristic(s) of the object 104. As noted above, the first mitigating action(s) may be based on the direction of impact and/or the location of the impact on the vehicle 102. As such, in the example shown in FIG. 1, the safety system may depressurize certain component of the suspension system 110 at the front of the vehicle 102.

The performance of the first mitigating action(s) may occur prior or during the collision. Moreover, the instructions sent by the safety system for performing the first mitigating action(s) may be sent in anticipation of the collision such that the first mitigating action(s) are performed, or at least partially performed, prior to the predicted collision. For example, prior to the collision, the suspension system 110 may receive instructions with enough time for reducing hydraulic fluid pressure.

An operation 142 may include determining that the collision occurred. For example, the safety system may determine the occurrence of the collision. In some instances, sensor(s) may generate sensor data indicating that the collision occurred (e.g., g-force, change in velocity, acceleration, etc.). Additionally, other system(s) of the vehicle 102 may indicate the occurrence of the collision. For example, an airbag deployment system may activate airbags in the event of a collision. This deployment of the airbags may be used to determine the occurrence of the collision.

An operation 144 may include determining one or more second mitigating action(s). For example, based at least in part on the collision, the safety system may undertake additional mitigating action(s). In some instances, the one or more second mitigating action(s) may include opening the release valve 130 fluidly connected to the accumulator 118, enlisting the assistance of emergency services, turning off the vehicle 102, and so forth. In some instances, the one or more second mitigating action(s) may be performed to increase a safety of the occupant(s) of the vehicle 102, occupant(s) of the object 104, and/or to otherwise provide assistance in the event of a collision.

However, in some instances, the second mitigating action(s) may be performed prior to the collision and based at least in part on determining that the collision is set to occur before the first mitigating action(s) may be performed (i.e., a response time of the first mitigating action(s)). That is, as introduced above, the first mitigating action(s) may have a given response time for reducing the hydraulic pressure within the suspension system 110. In some instances, if the time to perform the first mitigating action(s) is greater than, or is set to occur after the predicted collision, the second mitigating action(s) may be performed. In other words, the second mitigating action(s) may be performed prior to the collision actually occurring, in instances where the collision is predicted to occur at a time before performance of the first mitigating action(s) may be carried out.

An operation 146 may include performing the one or more second mitigating action(s). For example, the safety system may transmit an instruction to the suspension system 110 to open the release valve 130 and evacuate the pressurized gas 126. In some instances, other system(s) of the vehicle 102 may instruct, or cause, the suspension system 110 to open the release valve 130. For example, in the event that the airbag deployment system deploys airbag(s), a signal or instruction may be sent to the suspension system 110 that causes the release valve 130 to open.

Figure 2:
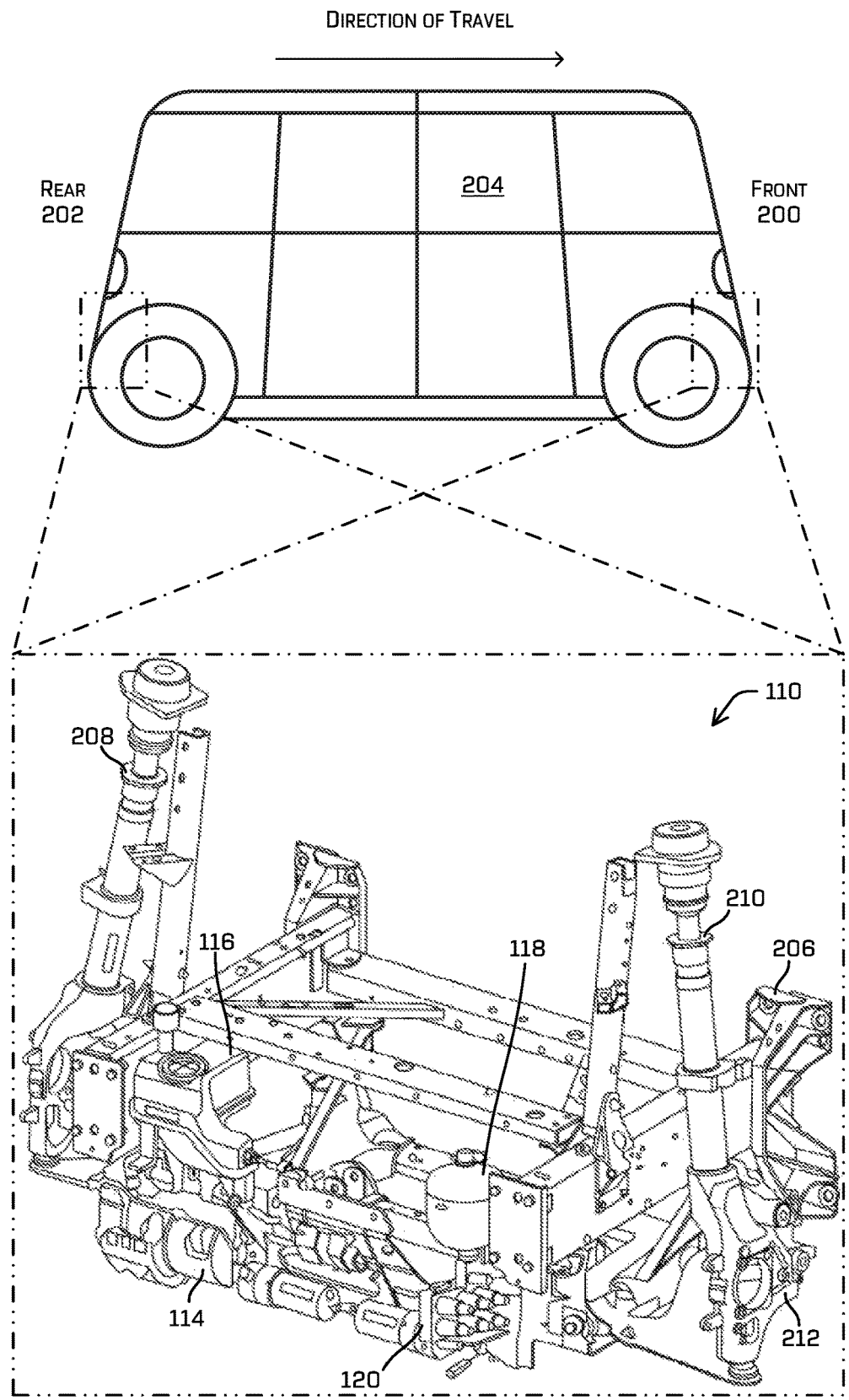
FIG. 2 is an illustration of an example components of an example suspension system of a vehicle.

FIG. 2 illustrates example components of the suspension system 110. As illustrated, the vehicle 102 may include separate suspension systems 110 disposed at a front 200 and/or a rear 202 of the vehicle 102 (relative to a direction of travel). Although the discussion herein relates to one suspension system (i.e., the suspension system 110), the suspension system 110 may be representative of a suspension system disposed at the front 200 and the rear 202. In other words, the vehicle 102 may include a first suspension system disposed at the front 200 and a second suspension system disposed at the rear 202. The suspension systems of the vehicle 102 may be independently operable and include separate components.

The vehicle 102 shown in FIG. 2 is an automobile having four wheels and respective tires for each of the wheels. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, any combination thereof, and/or any other suitable power sources. In addition, although the vehicle 102 has four wheels, the systems and methods described herein may be incorporated into vehicles having fewer or a greater number of wheels, tires, and/or tracks. In some instances, the vehicle 102 may include four wheel steering and may operate generally with equal performance characteristics in all directions. The vehicle 102 may include a body 204 to protect occupants and/or pedestrians. In various examples, the body 204 may include an exterior portion and/or an occupant portion in which an occupant may travel.

As shown in the detailed view of FIG. 2, the suspension system 110 may couple to a vehicle chassis 206. The body 204 may mount to or otherwise couple to the vehicle chassis 206. Introduced above, the suspension system 110 may include strut(s) 112, such as a first strut 208 and a second strut 210. The first strut 208 and the second strut 210 may couple to an axle carriage 212 receiving wheels of the vehicle 102 and portions of the body 204. The first strut 208 and the second strut 210 may include, or be fluid connected to, respective strut actuators that supply hydraulic fluid and/or adjust a position of the first strut 208 and/or the second strut 210, respectively (e.g., extended length). For example, the first strut 208 and the second strut 210 (or the strut actuators) may fluidly connect to the pump 114. In some instances, the pump 114 may represent a pump unit having one or more sensor(s) for monitoring temperature, revolutions per minute, voltage, current, etc. and/or controller(s) for controlling an operation of the pump 114.

The suspension system 110 may further include the fluid reservoir 116 fluidly connected to the pump 114, the first strut 208, and the second strut 210. The fluid reservoir 116 may represent a low-pressure reservoir for accommodating excess hydraulic fluid within the suspension system 110. In some instances, the fluid reservoir 116 may include sensor(s) for measuring a temperature of hydraulic fluid within the fluid reservoir 116 and/or a level of the hydraulic fluid within the fluid reservoir 116.

The suspension system 110 further includes the accumulator 118 fluidly connected to the pump 114, the fluid reservoir 116, the first strut 208, and the second strut 210. As discussed above in regard to FIG. 1, the accumulator 118 may represent high-pressure vessel acting as a storage device for providing makeup hydraulic fluid flow to the suspension system 110. The accumulator 118 may also include, or be fluidly connected to, a plurality of valves for supplying hydraulic fluid to, and receiving hydraulic fluid from, components of the suspension system 110 (e.g., the first strut 208 and the second strut 210).

The valve block 120 may be fluidly connected to the pump 114, the fluid reservoir 116, the accumulator 118, the first strut 208 (or actuator), and the second strut 210 (or actuator). The valve block 120 may include various valves, such as control valves, pressure valves, temperature valves, and so forth, for supplying or routing hydraulic fluid within the suspension system 110. In some instances, the accumulator 118 may mount to the valve block 120.

As illustrated in FIG. 2, the suspension system(s) 110 of the vehicle 102 may be located on longitudinal ends (i.e., the front 200 and the rear 202). Given this location, the components of the suspension system(s) 110 may be susceptible to ruptures, breaks, or damage during collisions. For example, the suspension system 110 may be susceptive to damage in the event of a front-end collision at the front 200 and/or a rear-end collision at the rear 202. In such instances, the hydraulic fluid pressure within the suspension system(s) 110 may cause hydraulic fluid to spray onto the vehicle 102, the object 104, and/or within the environment. This spraying or aerosolizing of the hydraulic fluid may lead to potential fires in the event of a spark (e.g., exhaust) or contact with a hot surface (e.g., catalytic converter). As such, as discussed herein, in an effort to increase safety, the hydraulic fluid pressure within the suspension system(s) 110 may be reduced to limit such spraying.

Further, in some instances, given the location of the suspension system(s) 110, prior to determining to reduce the hydraulic fluid pressure in one or more of the suspension system(s), an impact location of the predicted collision may be determined. For example, in the event of a predicted front-end collision, the hydraulic fluid pressure in the suspension system 110 at the front 200 may be reduced. In the event of a predicted rear-end collision, the hydraulic fluid pressure in the suspension system 110 at the rear 202 may be reduced. In the event of a predicted side collision hydraulic fluid pressure in the suspension system 110 at the front 200 and/or the suspension system 110 at the rear 202 may be reduced. Alternatively, in the event of a predicted side collision, the hydraulic fluid pressure within the suspension system 110 at the front 200 and/or the suspension system 110 at the rear 202 may not be reduced. For example, in the event of predict side collisions, the suspension system(s) 110 may be insulated or better protected from rupture (e.g., frame, wheels, etc.).

Figure 3:
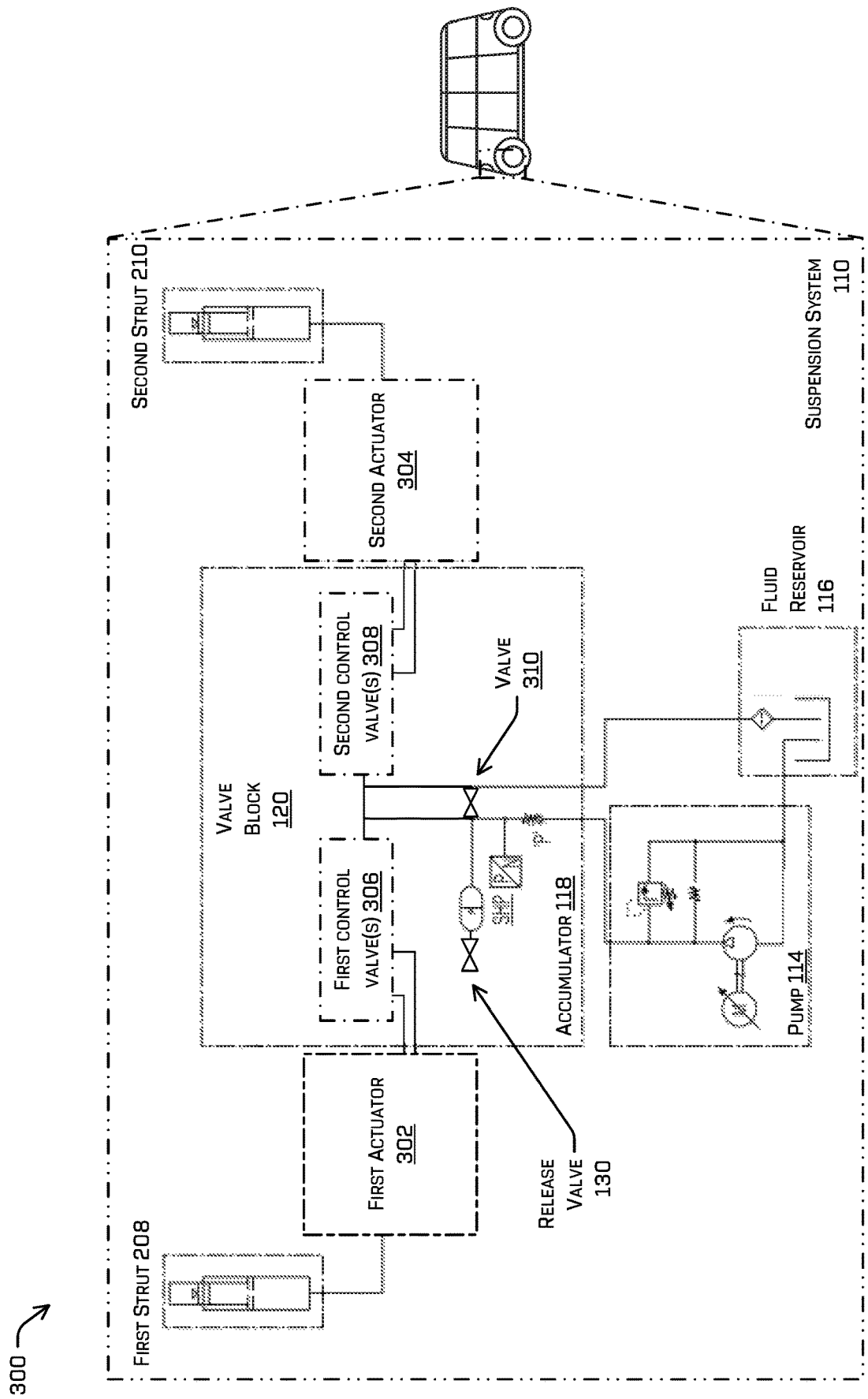
FIG. 3 is an illustration of an example hydraulic circuit of an example suspension system.

FIG. 3 is an example hydraulic fluid circuit 300 for a hydraulic fluid system, such as the suspension system 110. As introduced above, the suspension system 110 may include the first strut 208 and the second strut 210, which connect to a frame vehicle chassis 206 of the vehicle 102. The first strut 208 may fluidly connect to a first actuator 302 for adjusting a hydraulic fluid pressure within or supplied to the first strut 208. Similarly, the second strut 210 may fluidly connect to a second actuator 304 for adjusting a hydraulic fluid pressure within or supplied to the second strut 210.

The first strut 208 fluidly connects to the accumulator 118 via first control valve(s) 306 and one or more hydraulic lines. The second strut 210 fluidly connects to the accumulator via second control valve(s) 308 and one or more hydraulic lines. Generally, the valve block 120 may function to distribute hydraulic fluid throughout the suspension system 110. For example, the valve block 120 may include one or more control valve(s) that adjust the flow of hydraulic fluid within the suspension system 110 based on temperature of the hydraulic fluid and/or a pressure of the hydraulic fluid. In some instances, the valve block 120 may include or fluidly connect to the accumulator 118. The accumulator 130 is shown including the release valve 130 fluidly coupled to the accumulator 118 for releasing the pressurized gas 126.

In some instances, the suspension system 110 may include different types of actuator(s) for adjusting a flow rate of the hydraulic fluid. Without limitation, the actuator(s) may include electric motor actuators, pneumatic actuators, hydraulic actuators, and/or solenoid actuators. Additionally, the suspension system 110 may include controller(s) communicatively coupled to the valves, actuator(s), pump(s), etc. for controlling an operation of the suspension system 110, opening and controlling valves, and so forth. The accumulator 118 fluidly connects to the pump 114, or a motor pump unit (e.g., pump, motor, and transmission), for receiving pressurized hydraulic fluid. Additionally, the pump 114 fluidly connects to the fluid reservoir 116. As shown, the fluid reservoir 116 may also fluidly connect to the accumulator 118 (or the valve block 120) via a high-pressure line. The valve block 120 may also couple to the fluid reservoir 116 via a low-pressure line. The valve block is further shown include a valve 310 fluidly connected to a hydraulic line between the accumulator 118 and the pump 114, and a hydraulic line between the accumulator 118 and the fluid reservoir 116. In such instances, the valve 310 may fluidly connect the high-pressure line and the low-pressure line. The valve 310 may be opened to selectively reduce hydraulic pressure within the suspension system 110, such as the accumulator 118, while maintaining hydraulic pressure within the first strut 208 and the second strut 210. However, in some instances, valve(s) within the valve block 120 (e.g., the first control valve(s) 306 and the second control valve(s) 308) may be opened for reducing hydraulic fluid pressure within the suspension system 110 and draining hydraulic fluid to the fluid reservoir 116.

The suspension system 110 may include sensor(s) for determining, or measuring, a chassis position of the frame 206, a pressure in the first strut 208 and/or the second strut, and/or positions of the first actuator 302 and/or the second actuator 304.

Figure 4:
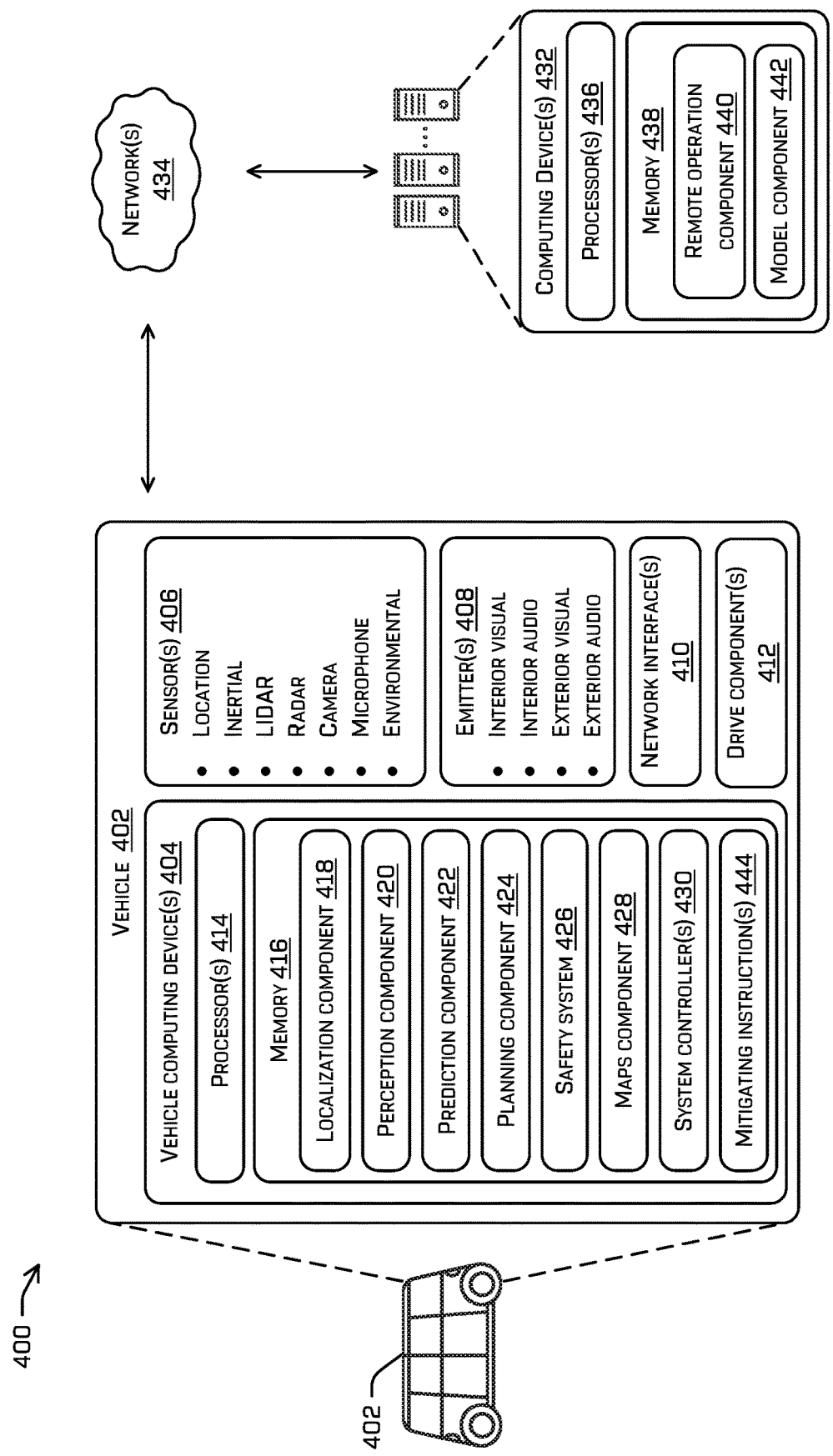
FIG. 4 is a block diagram of an example system for implementing the techniques described herein.

FIG. 4 illustrates a block diagram of an example system 400 that implements the techniques discussed herein. In some instances, the example system 400 may include a vehicle 402, which may represent the vehicle 102 in FIG. 1. In some instances, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 402 may be a fully or partially autonomous vehicle having any other level or classification. Moreover, in some instances, the techniques described herein may be usable by non-autonomous vehicles as well.

The vehicle 402 may include one or more vehicle computing device(s) 404, one or more sensor(s) 406, one or more emitter(s) 408, one or more network interfaces(s) 410 (also referred to as communication devices and/or modems), and one or more drive component(s) 412. In some instances, the one or more sensor(s) 406 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor(s) 406 may include multiple instances of each of these or other types of sensors. For instance, the time-of-flight sensors may include individual time-of-flight sensors located at the corners, front, back, sides, and/or top of the vehicle 402. As another example, the camera sensors may include multiple cameras disposed at various locations about the exterior and/or interior of the vehicle 402. The one or more sensor(s) 406 may provide input to the vehicle computing device(s) 404.

The one or more emitter(s) 408 may emit light and/or sound. The one or more emitter(s) 408 in this example may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 may also include one or more network interface(s) 410 that enable communication between the vehicle 402 and one or more other local or remote computing device(s) (e.g., a remote teleoperation computing device) or remote services. For instance, the one or more network interface(s) 410 may facilitate communication with other local computing device(s) on the vehicle 402. Also, the one or more network interface(s) 410 may allow the vehicle 402 to communicate with other nearby computing device(s) (e.g., other nearby vehicles, traffic signals, etc.). The one or more network interfaces(s) 410 may include physical and/or logical interfaces for connecting the vehicle computing device(s) 404 to another computing device or one or more external networks (e.g., the Internet). For example, the one or more network interface(s) 410 may enable Wi-Fi-based communication such as via frequencies defined by the IEEE 802.11 standards, short range wireless frequencies such as Bluetooth, cellular communication (e.g., 2G, 3G, 4G, 4G LTE, 4G, etc.), satellite communication, dedicated short-range communications (DSRC), or any suitable wired or wireless communications protocol that enables the respective computing device to interface with the other computing device(s).

In at least one example, the vehicle 402 may include one or more drive component(s) 412. In some examples, the vehicle 402 may have a single drive component 412. In at least one example, if the vehicle 402 may have multiple drive components 412, where individual drive components 412 may be positioned on opposite ends of the vehicle 402 (e.g., the front and the rear, etc.). In at least one example, the drive component(s) 412 may include the one or more sensor(s) 406 to detect conditions of the drive component(s) 412 and/or the surroundings of the vehicle 402. By way of example and not limitation, the sensor(s) 406 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive component(s) 412. In some cases, the sensor(s) 406 on the drive component(s) 412 may overlap or supplement corresponding systems of the vehicle 402 (e.g., sensor(s) 406).

The drive component(s) 412 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 412 may include a drive system controller which may receive and preprocess data from the sensor(s) 406 and to control operation of the various system(s) and/or component(s) of the vehicle 402. In some examples, the drive system controller may include one or more processor(s) and memory communicatively coupled with the one or more processor(s). The memory may store one or more components to perform various functionalities of the drive component(s) 412. Furthermore, the drive component(s) 412 also include one or more communication connection(s) that enable communication by the respective drive system with one or more other local or remote computing device(s).

As shown, the vehicle computing device 404 may include one or more processor(s) 414 and memory 416 communicatively coupled with the one or more processor(s) 414. In the illustrated example, the memory 416 of the vehicle computing device(s) 404 stores a localization component 418, a perception component 420, a prediction component 422, a planning component 424, a safety system 426, a map component 428, and one or more system controller(s) 430. Though depicted as residing in the memory 416 for illustrative purposes, it is contemplated that the localization component 418, the perception component 420, the prediction component 422, the planning component 424, the safety system 426, the maps component 428, and the one or more system controller(s) 430 may additionally, or alternatively, be accessible to the vehicle computing device(s) 404 (e.g., stored in a different component of vehicle 402) and/or be accessible to the vehicle 402 (e.g., stored remotely).

In the memory 416 of the vehicle computing device(s) 404, the localization component 418 may include functionality to receive data from the sensor(s) 406 to determine a position of the vehicle 402. For example, the localization component 418 may include and/or request/receive a three-dimensional map of an environment and may continuously determine a location of the autonomous vehicle within the map. In some instances, the localization component 418 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 418 may provide data to various components of the vehicle 402 to determine an initial position of an autonomous vehicle for generating a trajectory, as discussed herein.

The perception component 420 may include functionality to perform object detection, segmentation, and/or classification. In some examples, the perception component 420 may provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In some instances, the perception component 420 may include functionality to store perception data generated by the perception component 420. In some instances, the perception component 420 may determine a track corresponding to an object that has been classified as an object type. The stored perception data may, in some examples, include fused perception data captured by the vehicle 402. Fused perception data may include a fusion or other combination of sensor data from sensor(s) 406, such as image sensors, lidar sensors, radar sensors, time-of-flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data.

The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.).

In additional and/or alternative examples, the perception component 420 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The perception component 420 may use perception algorithms to determine a perception-based bounding box associated with an object in the environment based on sensor data. For example, the perception component 420 may receive image data from the one or more sensor(s) 406 and classify the image data to determine that an object is represented in the image data. Then, using detection algorithms, the perception component 420 may generate a two-dimensional bounding box and/or a perception-based three-dimensional bounding box associated with the object. The perception component 420 may further generate a three-dimensional bounding box associated with the object. The three-dimensional bounding box may provide additional information such as a location, orientation, pose, and/or size (e.g., size, width, height, etc.) associated with the object.

The prediction component 422 may generate one or more probability maps representing prediction probabilities of possible locations of one or more objects in an environment. For example, the prediction component 422 may generate one or more probability maps for vehicles, pedestrians, animals, and the like within a threshold distance from the vehicle 402. In some instances, the prediction component 422 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

The planning component 424 may determine a path for the vehicle 402 to follow to traverse through an environment. For example, the planning component 424 may determine various routes and paths and various levels of detail. In some instances, the planning component 424 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 424 may generate an instruction for guiding the vehicle 402 along at least a portion of the route from the first location to the second location. In at least one example, the planning component 424 may determine how to guide the vehicle 402 from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 424 may alternatively, or additionally, use data from the perception component 420 and/or the prediction component 422 to determine a path for the vehicle 402 to follow to traverse through an environment. For example, the planning component 424 may receive data from the perception component 420 and/or the prediction component 422 regarding objects associated with an environment. Using this data, the planning component 424 may determine a route to travel from a first location (e.g., a current location) to a second location (e.g., a target location) to avoid objects in an environment.

In at least some examples, such a planning component 424 may determine there is no such collision free path and, in turn, provide a path which brings vehicle 402 to a safe stop avoiding all collisions and/or otherwise mitigating damage.

The safety system 426 may determine mitigating instruction(s) 444 for avoiding or increasing the safety of occupants during predicted collisions. For example, the safety system 426 may determine a collision probability associated with a vehicle and an object. The safety system 426 may determine the collision probability based on a predicted intersection associated with the vehicle 402 and the object. The safety system 426 may determine the collision probability is equal to, or greater than, a threshold. In some instances, the safety system 426 may determine velocities of the vehicle 402 with respect to a collision probability. A velocity associated with the vehicle 402 at an initial predicted location may be determined. A velocity associated with the vehicle 402 at an earlier predicted location may be determined based on interpolation between the velocity associated with the vehicle 402 at the initial predicted location and an original velocity associated with the vehicle 402 at a current position (e.g., start position).

Additionally, the safety system 426 may determine an impact location between the vehicle 402 and the object based at least in part on trajectories of the vehicle 402 and/or the object. For example, the safety system 426 may determine that the intersection between the vehicle 402 and the object is on a side, front, rear, etc. of the vehicle 402.

The safety system 426 may also classify and/or characterize the object. For example, the safety system 426 may determine a height, size, volume, trajectory, speed, closing speed (e.g., closure rate), acceleration, etc. of the object for purposes of adjusting a ride height of the vehicle 402. In instances where the object is a vehicle, the safety system 426 may also determine a type of vehicle associated with the collision and/or a bumper height of the vehicle. Such determination may be used when adjusting a ride height of the vehicle for aligning a crash safety structure of the vehicle with that of the bumper (or other frame components) of the object.

In some instances, the safety system 426 may determine which mitigating instruction(s) 444 to perform based on the predicted collision and/or the impact location. Based on the predicted collision, the safety system 426 may cause the mitigating instruction(s) 444 to be performed. As introduced above, the mitigating instruction(s) 444 may generally relate to reducing hydraulic fluid pressure within hydraulic system(s) of the vehicle 402, such as suspension system(s) (e.g., the suspension system 110). For example, the mitigating instruction(s) 444 may include depressurizing or reducing hydraulic fluid pressure in the suspension system to reduce an amount hydraulic fluid aerosolized during a collision and/or rupture of component(s) of the suspension system. By way of example, and not limitation, the mitigating instruction(s) 444 may include opening a release valve (e.g., the release valve 130) of an accumulator (e.g., the accumulator 118) to release pressurized gas (e.g., the pressurized gas 126) within the accumulator, opening valve(s) of the suspension system, opening additional valve(s) (e.g., the valve block 120) to depressurize the accumulator, turning off a pump (e.g., the pump 114) of the suspension system, draining hydraulic fluid into a low-pressure fluid reservoir (e.g., the fluid reservoir 116), raising and/or lowering a ride height of the vehicle 402, and so forth.

The safety system 426 may be configured to signal the hydraulic system(s) for causing the mitigating instruction(s) 444 to be performed. For example, the safety system 426 may include a signaling component configured to receive an indication of predicted collision with an object and send a signal to the hydraulic system(s) for reducing hydraulic fluid pressure and/or adjusting the height of the vehicle. In various examples, the signal may cause valve(s) in the hydraulic system to open and drain hydraulic fluid to a low-pressure fluid reservoir. Additionally, the signal may cause actuator(s) to expel hydraulic fluid into the strut(s) for raising a ride height of the vehicle 402. In some examples, the signal may include a timing component such that the mitigating instruction(s) 444 are performed a particular time and/or after an indicated period of time. In some instances, the safety system 426 may transmit instructions to the hydraulic system(s) in advance, and with enough time, for the mitigating action(s) to be performed or at least partially performed.

In some instances, the safety system 426 may be configured to determine a time associated with the collision, or whether the collision is imminent. The time may be a particular time, such as, for example, 120 milliseconds after 3:05 pm, or it may be a time interval from a time in which predicted collision was determined. The time may be determined based on a measured closure rate of the object toward the vehicle 402, a velocity of the vehicle 402, an acceleration of the vehicle 402, a velocity of the object, an acceleration of the object, road conditions, weather conditions, and/or other factors that may affect a closure rate of the object toward the vehicle 402, or vice versa.

The memory 416 may further include one or more map component(s) 428 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more map component 428 may include at least one map (e.g., images and/or a mesh). In some examples, the vehicle 402 may be controlled based at least in part on the map component 428. That is, the map component 428 may be used in connection with the localization component 418, the perception component 420 (and sub-components), the prediction component 422, and/or the planning component 424 to determine a location of the vehicle 402, identify objects in an environment, generate prediction probability(ies) associated with objects and/or the vehicle 402, and/or generate routes and/or trajectories to navigate within an environment.

In at least one example, the vehicle computing device 404 may include one or more system controller(s) 430, which may be configured to control steering, propulsion, braking, safety, emitters, communication, and other systems of the vehicle 402. These system controller(s) 430 may communicate with and/or control corresponding systems of the drive component(s) 412 and/or other components of the vehicle 402, which may be configured to operate in accordance with a path provided from the planning component 424.

The vehicle 402 may connect to computing device(s) 432 via a network 434 and may include one or more processor(s) 436 and memory 438 communicatively coupled with the one or more processor(s) 436. In at least one instance, the one or more processor(s) 436 may be similar to the processor(s) 414 and the memory 438 may be similar to the memory 416. In the illustrated example, the memory 438 of the computing device(s) 432 stores a remote operation component 440 and/or a model component 442. In at least one instance, the model component 442, after empirical testing and/or simulations, may generate ML models to be used by the perception component 420, as discussed herein. Though depicted as residing in the memory 438 for illustrative purposes, it is contemplated that the remote operation component 440 and the model component 442 may additionally, or alternatively, be accessible to the computing device(s) 432 (e.g., stored in a different component of computing device(s) 432 and/or be accessible to the computing device(s) 432 (e.g., stored remotely). The model component 442 may include functionality to generate models for determining heights/classifications of multi-channel image data, as discussed herein.

The processor(s) 414 of the vehicle computing device 404 and the processor(s) 436 of the computing device(s) 432 may be any suitable processor capable of executing instructions to process data and perform operations as described herein. By way of example and not limitation, the processor(s) 414 and 436 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 416 vehicle computing device 404 and the memory 438 of the computing device(s) 432 are examples of non-transitory computer-readable media. The memory 416 and 438 may store an operating system and one or more software applications, instructions, programs, and/or data to implement the methods described herein and the functions attributed to the various systems. In various implementations, the memory 416 and 438 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine-learning algorithms. For example, in some instances, the components in the memory 416 and 438 may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Figure 5:
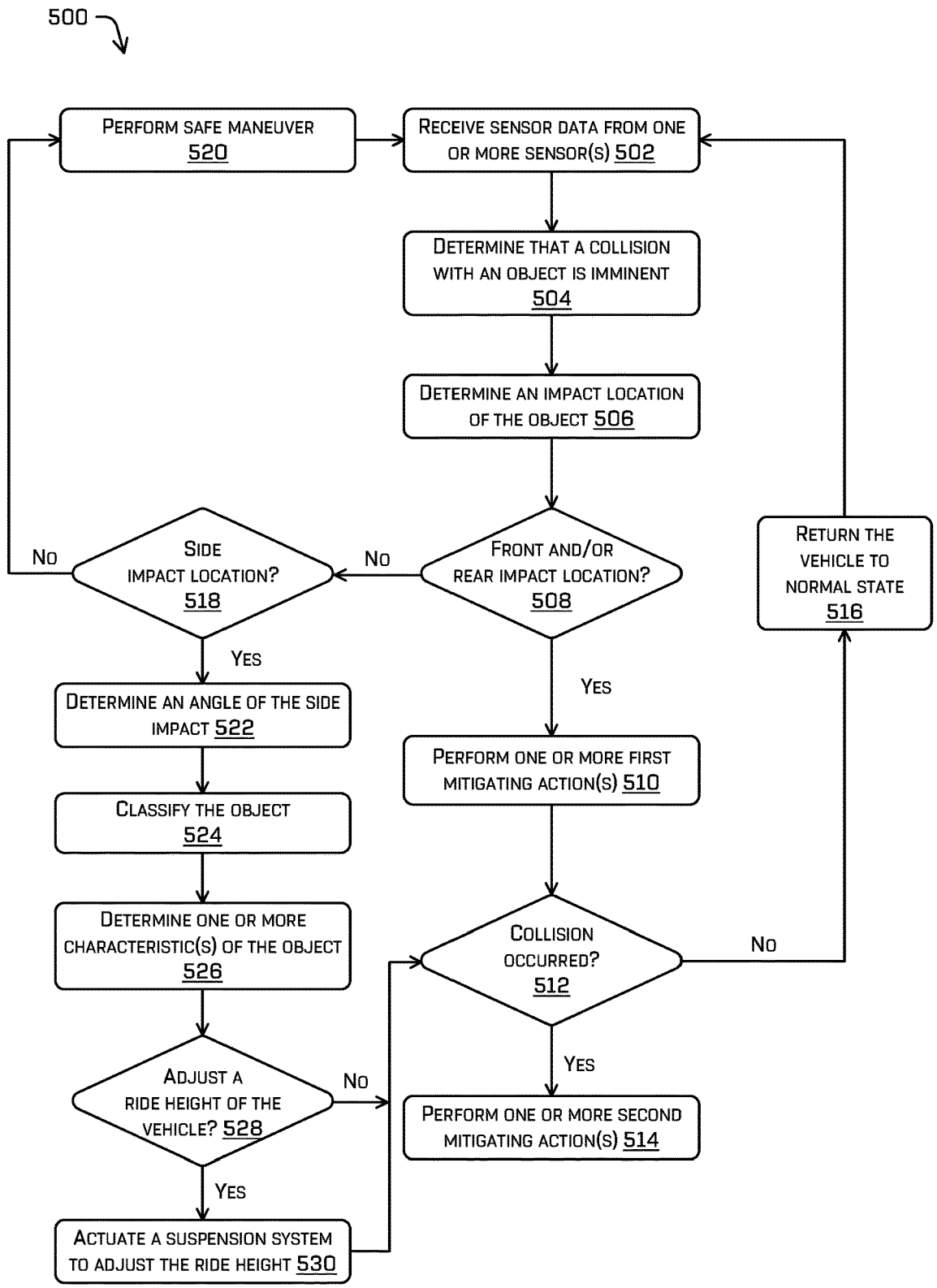
FIG. 5 is an example process for determining mitigating action(s) associated with a collision.

FIG. 5 is an example process 500 for predicting a collision and determining one or more mitigating action(s) to perform based at least in part on the predicted collision. The process 500 is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

In some instances, some or all of the process 500 may be performed by one or more components in FIG. 4, as described hereinabove. For example, some or all of the process 500 may be performed by the vehicle computing device(s) 404.

At operation 502, the process 500 may include receiving sensor data captured by a sensor on an autonomous vehicle in an environment. For example, the sensor(s) 406 may capture sensor data associated with an environment through which the vehicle 402 is travelling.

At operation 504, the process 500 may include determining that a collision with an object is imminent. For example, the safety system 426 may receive sensor date from the sensor(s) 406 and determine that a collision is imminent. In some instances, a determination that the collision is imminent may include detecting an object (e.g., another vehicle, pole, wall, etc.) in the environment, determining that the object has a high closure rate toward the vehicle 402 (e.g., the vehicle 402 sliding toward the object, an object trajectory aimed at side of the vehicle 402, etc.), and/or determining that an object trajectory intersects with a vehicle trajectory. Additionally, or alternatively, whether the collision is imminent may include a determination of whether a collision probability is greater than a threshold probability. Further, whether the collision is imminent may be based at least in part on the predicted collision occurring within a predetermined or threshold time (e.g., 3 seconds, 5 seconds, etc.). In some instances, the threshold time may be a pre-determined amount of time and/or may be based on a speed of the vehicle 402 and/or the object, an acceleration of the vehicle 402 and/or the object, weather, traffic density, and/or other considerations.

At operation 506, the process 500 may include determining an impact location of the object. For example, based on the vehicle trajectory and/or the object trajectory, the safety system 426 may determine a predicted location of the collision on the vehicle 402. For example, the safety system 426 may determine whether the impact location is on the front of the vehicle 402, the rear of the vehicle 402, a front-corner of the vehicle 402, and so forth.

At operation 508, the process 500 may include determining whether the impact location is on the front or the rear of the vehicle. Determining whether the impact location is on the front or the rear of the vehicle 402 may be utilized for performing mitigating action(s) associated with the predicted collision. For example, as the suspension system(s) are located at the front and rear of the vehicle 402, those collisions that are not predicted to collide with the front and/or rear of the vehicle 402, or which do not otherwise pose danger to the suspension system rupturing, may be ignored for purposes of depressurizing the suspension system. If at 508 the process 500 determines that impact location is at front or rear of the vehicle, the process 500 may follow the "YES" route and proceed to 510. More generally, however, the process 500 may proceed to 510 if the suspension system is at risk of being damaged.

At operation 510, the process 500 may include performing one or more first mitigating action(s). The one or more first mitigating action(s) may be associated with depressurizing one or more hydraulic system(s) of the vehicle 402. For example, the vehicle 402 may include a first suspension system located at the front of the vehicle 402 and a second suspension system located at the rear of the vehicle 402. Hence, determining that the impact location is at the front or the rear may be used for reducing a hydraulic fluid pressure in one or more suspension system(s) of the vehicle 402. For example, if the impact location is predicted to be at the front of the vehicle 402, the hydraulic fluid pressure in a first suspension system (or a suspension system at the front) may be reduced. However, in some instances, even in the event of a predicted frontal impact location, the hydraulic fluid pressure in a second suspension system (or a suspension system at the back) may be reduced. Alternatively, if the impact location is predicted to be at the rear of the vehicle 402, the hydraulic fluid pressure in the second suspension system may be reduced. Additionally, in some instances, even in the event of a predicted rear impact location, the hydraulic fluid pressure in the first suspension system may be reduced.

In some instances, the one or more first mitigating action(s) may include reducing a pressure in the suspension system(s) to limit or prevent hydraulic fluid being sprayed. Reducing pressure in the suspension system(s) may include opening valves of the suspension system(s) to route fluid to the fluid reservoir. Additionally, or alternatively, a pump of the suspension system(s) may be turned off. The first mitigating action(s) may also include opening a release valve and allowing pressurized gas to evacuate an accumulator. For example, evacuating the pressurized gas may force a bladder of the accumulator to retract to allow additional hydraulic flow into the accumulator. Additionally, or alternatively, the first mitigating action(s) may include depressurizing or reducing a pressure in certain components of the suspension system. For example, the hydraulic fluid pressure in the accumulator may be reduced by opening a dump valve. In some instances, opening the dump valve may route the hydraulic fluid from the actuator to the fluid reservoir. In such instances, the fluid side of the accumulator may be depressurized.

Performance of the first mitigating action(s) may include the safety system 426 transmitting instructions to the suspension system(s). For example, in the event of a predicted collision at the front of the vehicle 402, the safety system 426 may transmit an instruction (e.g., signal) to the suspension system at the front. In response, the suspension system may perform an associated action (e.g., open valve(s), turn off pump(s), etc.). By way of example, the safety system 426 may instruct the suspension system (e.g., a controller of the suspension system) to route the hydraulic fluid into the low pressure fluid reservoir. As part of this process, the suspension system (e.g., controller(s)) may instruct valve(s) to open and/or the pump(s) to turn off. This allows the hydraulic fluid pressure within the suspension system to reduce and causes the hydraulic fluid to drain into the fluid reservoir. Upon collision and/or rupture of the components of the suspension system, the reduced hydraulic fluid pressure may limit the amount of hydraulic fluid spray. As such, based on a determination that the collision is imminent, the safety system 426 may send a signal to the suspension system for reducing hydraulic fluid pressure.

Additionally, in some instances, safety system 426 may be configured to determine a predicted time of the collision for performing the one or more first mitigating action(s). The predicted time of collision may be based on a speed of the vehicle 402, an acceleration of the vehicle 402, a speed of the object, an acceleration of the object, a closure rate of the object toward the vehicle 402, road conditions, weather conditions, and/or other factors that may affect a closure rate of the object toward the vehicle 402, vice versa. In some examples, based on the predicted time, the safety system 426 may send a signal to the suspension system to reduce the hydraulic fluid pressure concurrently with or immediately prior to (e.g., 0.1 milliseconds, 0.2 milliseconds, 0.5 milliseconds, etc.) the predicted time of the collision.

In some instances, and as noted above, depressurizing the suspension system may cause the vehicle 402 to sag or slump. That is, due to the reduced hydraulic fluid pressure in the suspension system, the vehicle 402 may slump under the weight of the vehicle 402. However, in some instances, depressurizing certain components of the suspension system (e.g., the accumulator), may not affect the ride height of the vehicle.

In some instances, the one or more first mitigating action(s) that are selected to be performed may be based at least in part on the speed of the vehicle 402, the speed of the object, and/or the impact direction. For example, the first mitigating action(s) may be associated with response times or an amount of time for the suspension system to respond and have reduced hydraulic fluid pressure. In some instances, opening the release valve may reduce the hydraulic fluid pressure in the suspension system the fastest, given that the flow rate of the pressurized gas may be greater than the flow rate of hydraulic fluid back to the fluid reservoir. Selectively reducing the hydraulic fluid pressure by opening the dump valve may reduce the hydraulic fluid pressure slower than opening the release valve, but faster than depressurizing the suspension system. For example, the amount of electrical current required to open the dump valve may be less than the amount of electrical current to open other valve(s) in the entire suspension system. Additionally, opening the dump valve, as compared to a plurality of valves for the suspension system, may increase a responsiveness in reducing hydraulic fluid pressure.

At operation 512, the process 500 may include determining whether the collision occurred. For example, the safety system 426 or another system of the vehicle 402 may determine the occurrence of the collision. In some instances, the sensor(s) 406 (e.g., impact sensor) may generate sensor data indicating that the collision occurred. Additionally, other system(s) of the vehicle 402 may indicate the occurrence of the collision. For example, an airbag deployment system of the vehicle 402 may activate airbags in the event of a collision and this deployment of the airbags may be indicative of the collision occurring. At 512, if the collision occurred, the process 500 may follow the "YES" route and proceed to 514.

At operation 514, the process 500 may include performing one or more second mitigating action(s). For example, the safety system 426 may transmit an instruction to the suspension system to open the release valve and evacuate the pressurized gas. In some instances, other system(s) of the vehicle 402 may instruct, or cause, the suspension system to open the release valve. For example, in the event that the airbag deployment system deploys airbag(s), a signal or instruction may be sent to the suspension system that causes the release valve to open. The airbag deployment system, for example, may include a pyrotechnic actuator and when the pyrotechnic actuator actuates, a signal may be sent to the safety system 426 and/or the suspension system for reducing hydraulic fluid pressure. The release of hydraulic fluid pressure via the release valve reduces a pressure of the hydraulic fluid to prevent hydraulic fluid aerosols being cast into the environment. This may increase safety by reducing the risk of ignition or combustion of the hydraulic fluid. In some instances, the release valve 130 may be opened after the collision has occurred given that in instances when the pressurized gas is evacuated from the accumulator, the accumulator may need to be recharged with pressurized gas prior to the vehicle 402 resuming operation or transmit.

Alternatively, if at operation 512 the process 500 determines that the collision did not occur, the process 500 may follow the "NO" route and proceed to 516. At operation 516, the process 500 may include returning the vehicle to a normal state. For example, in instances where the collision is avoided, or otherwise does not occur, the safety system 426 (or another system) may cause the suspension system to re-pressurize. In re-pressurizing the suspension system, the vehicle 402 may resume travel and normal operations. From operation 516, the process 500 may loop to 502.

Alternatively, if at 508 the process 500 determines that the impact location is not on the front or the rear of the vehicle 402, the process may follow the "NO" route and proceed to 518. At operation 518, the process 500 may include determining whether the impact location is on a side of the vehicle or whether the object is predicted to collide with a side of the vehicle. If the process 500 at operation 518 determines that the impact location is not a side of the vehicle 402, the process 500 may follow the "NO" route and proceed to 520.

At operation 520, the process 500 may include performing a safe maneuver. For example, the vehicle 402 may perform a maneuver to avoid the collision (e.g., stop, swerve, etc.). In some instances, this may be referred to as a "no go" operation. In some instances, the vehicle computing device(s) 404 and/or the computing device(s) 432 may cause performance of the safe maneuver. Additionally, or alternatively, a teleoperations system, for example, as discussed in U.S. Pat. No. 10,386,836 titled "Interactions Between Vehicle and Teleoperations System" and issued Aug. 20, 2019, which is incorporated by reference herein in its entirety, may be in communication with the vehicle 402 and cause performance of the safe maneuver.

In other instances, even if the process 500 determines that the impact location is not a side of the vehicle 402, the process 500 may perform one or more mitigating actions.

Alternatively, if at 518 the process 500 determines that the impact location is on the side of the vehicle, the process 500 may follow the "YES" route and proceed to 522. At operation 522, the process 500 may include determining an angle of the side impact. For example, the safety system 426 may determine, relative to the vehicle 402, an angle of predicted collision. In some instances, the angle of impact may be based at least in part on the vehicle trajectory and/or the object trajectory.

At operation 524, the process 500 may include classifying the object. For example, the safety system 426 may classify the object to determine a type of object. In some instances, the safety system 426 may classify or determine the object type by analyzing sensor data from the sensor(s) 406. The object type, in some instances, may be a person, animal, vehicle (e.g., truck, car, semi truck, backhoe, etc.), building, sign, vegetation, and so forth. In some instances, the vehicle 402 or the safety system 426 may maintain a database or models of ideal or preferred impact locations associated with the predicted collision. These models may be determined, or otherwise selected, based at least in part on the classification of the object. For example, in classifying the object, the safety system 426 may select a model based on the position of the vehicle 402, the object, and/or the impact location. This model may in turn be used adjust the ride height of the vehicle 402 according to predetermined parameters.

At operation 526, the process 500 may include determining one or more characteristic(s) of the object. For example, the safety system 426 may determine characteristic(s) of the object that include, without limitation, one or more dimensions of the object, a size of the object, a volume of the object, a ride height of the object (e.g., a frame height, a bumper height, a center height between a top of the object and a bottom of the object), and so forth. As discussed herein, the classification of the object and/or the one or more characteristic(s) of the object may be used when determining whether to actuate the suspension system and/or an amount by which to adjust the suspension system for adjusting a ride height of the vehicle 402.

At operation 528, the process 500 may include determining whether to adjust the ride height of the vehicle. For example, adjusting the height of the vehicle 402 may better align frames, bumpers, or other safety rails of the vehicle 402 with that of the object. Determining whether to adjust the ride height, as well as how much to adjust the ride height, may be based at least in part on the classification of the object (e.g., car, truck, bus, etc.) and/or characteristic(s) of the object (e.g., ride height of the object, a bumper height of the object, height of a leading surface of the object, etc.). If the object is a larger vehicle, such as a truck with a higher ride height, then the safety system 426 may determine to raise the ride height. This may align a frame of the vehicle 402 with that of the object in order to increase the safety of the occupant(s) in the vehicle 402 and/or occupant(s) in the object. Alternatively, if the object is a person, the safety system 426 may refrain from adjusting the ride height. Moreover, as noted above, in some instances, part of adjusting the ride height may be based at least in part on predetermined model(s) stored in a database. The model(s), for example, may be stored in associated with certain object(s) and after classifying the object, the classification may be used to select a model for adjusting the ride height.

In some instances, adjusting the ride height may adjust a height of occupants within the vehicle 402 (e.g., raising seats). For example, the occupants within the vehicle 402 may be elevated to above a portion of the object (e.g., leading edge, bumper, etc.).

If at operation 528 the process 500 determines to not adjust the ride height, the process 500 may follow the "NO" route and proceed to 512 for determining whether the collision occurred. However, in some instances, as a result of determining to not adjust the ride height, the vehicle 402 may perform one or more safe maneuvers. Alternatively, if at operation 528 the process 500 determines to adjust the ride height, the process 500 may follow the "YES" route and proceed to 530.

At operation 530, the process 500 may include actuating the suspension system to adjust the ride height of the vehicle. For example, based on the classification and the characteristic(s) of the object, the safety system 426 may cause the ride height of the vehicle 402 to lower or raise. In some instances, an amount at which the ride height of the vehicle 402 is raised or lowered may be based at least in part on a bumper height, a center position associated with the collision, and/or frame height of the object. For example, if the object is a larger vehicle (e.g., semi-truck, bus, etc.) that has a higher bumper height, the ride height of the vehicle 402 may be raised to align a frame or safety structure of the vehicle 402 with that of the object. Alternatively, if the object is a smaller vehicle (e.g., sedan, coupe, etc.) that has a lower bumper height, the ride height of the vehicle 402 may be lowered to align the frame or safety structure the vehicle 402 with that of the object. In some instances, the safety structure of the vehicle 402 that aligns with the bumper height or frame height of the object may be similar to those described in U.S. patent application Ser. No. 16/717,928 titled "Side-Impact Crash Structure," filed Dec. 17, 2019, which is incorporated by reference herein in its entirety.

In some instances, adjustment of the ride height may include adjusting at least a portion of the ride height of the vehicle 402 (e.g., corners, ends, sides, etc.). For example, the vehicle 402 may include a first suspension system located at the front of the vehicle 402 and a second suspension system located at the rear of the vehicle 402. Adjusting the ride height may include actuating one or more strut(s) of the first suspension system and/or one or more strut(s) of the second suspension system. Ends, sides, or corners of the vehicle 402 may therefore be disposed at various heights and the vehicle 402 may be adjusted to various rolls and pitches.

To adjust the ride height, the safety system 426 communicatively couples to the suspension system. Responsive to receiving a signal indicating a side impact with the object, the suspension system may cause the strut(s) to lower or raise via a decrease or increase in hydraulic fluid pressure (e.g., as controlled by actuator(s)). For example, responsive to a signal or instruction from the safety system 426, the suspension system may cause the pump to increase a pressure of the hydraulic fluid for raising a ride height of the vehicle 402. Alternatively, the suspension system may open valves and allow hydraulic fluid to flow into the fluid reservoir for lowering the ride height. In some instances, the amount by which the ride height raises or lowers may be based on a current ride height of the vehicle 402 and that of the object. From operation 530, the process 500 may proceed to the operation 512 for determining whether the collision occurred and determining whether to perform mitigating action(s) associated with the collision occurring.

Although the discussion of the process 500 relates to the safety system 426 instructing or causing performance of the mitigating action(s), the vehicle 402 may include one or more additional, or redundant, systems and/or sensor(s) to ensure the safety of the occupant(s) of the vehicle 402 and/or the object, as well as the environment. For example, the vehicle 402 may include impact sensors that detect an impact with the object (and/or surface) and send the signal to the suspension system. Additionally, the perception component 420 may be configured to detect and identify objects and/or surfaces in the environment based on the sensor data. In various examples, when the perception component 420 sense(s) an imminent impact, the perception component 420 may send a signal to the suspension system indicating imminent collision and/or an collision with the object.

Figure 6:
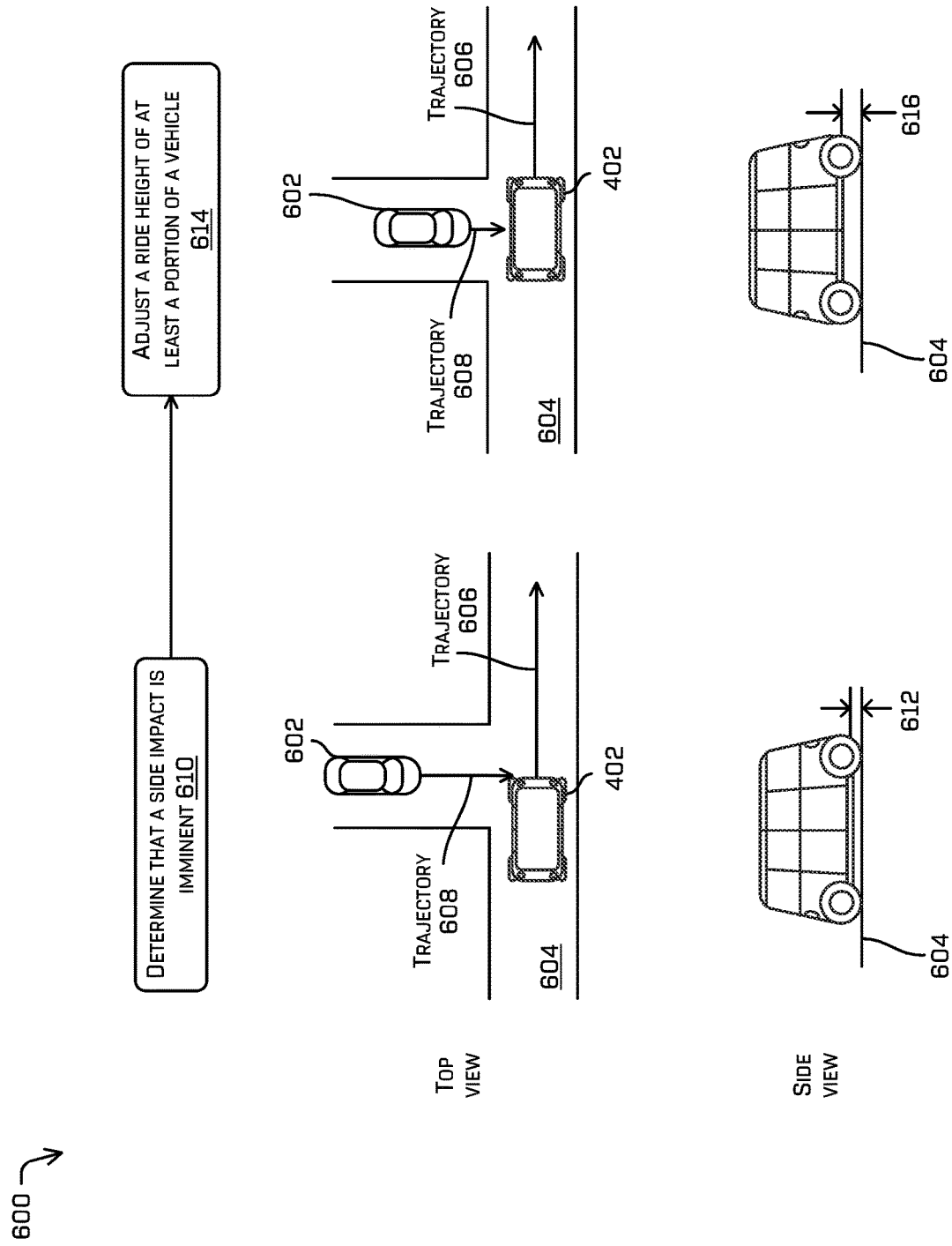
FIG. 6 is a pictorial flow diagram of an example process for adjusting a height of a vehicle based on a predicted collision.

FIG. 6 is a pictorial flow diagram of an example process 600 for adjusting a ride height of the vehicle 402. In FIG. 6, the vehicle 402 and an object 602 are traversing along a roadway 604. The vehicle 402 may have a vehicle trajectory 606, while the object 602 may be associated with an object trajectory 608. In some instances, the vehicle 402 may determine the vehicle trajectory 606 and/or the object trajectory 608, as discussed above.

An operation 610 may include determining that a side impact is imminent. For example, using the vehicle trajectory 606 and/or the object trajectory 608, the safety system 426 may determine that a collision is imminent between the vehicle 402 and the object 602. In some instances, the safety system 426 may determine that the collision is imminent based on the safety system 426 predicting that the collision has a probability greater than a threshold. Additionally, or alternatively, the safety system 426 may determine that the collision is imminent based on predicting the collision occurring occur within a threshold amount of time.

In some instances, at 610 and/or at a first instance, the vehicle 402 may have a first ride height 612. In some instances, the first ride height 612 may be measured from a ground surface associated with the roadway 604 and a bottom surface of a body of the vehicle 402. Alternatively, the first ride height 612 may be measured from a ground surface associated with the roadway 604 to a top surface of the body. Alternatively, the first ride height 612 may be determined using an extended or actuated length of the strut(s) of the suspension system and/or other component(s) of the suspension system. In some instances, the first ride height 612 may be measured from a ground surface associated with the roadway 604 to a central vertical point of the body. The sensor(s) 406 of the vehicle 402, in some instances may determine the ride height.

An operation 614 may include adjusting at least a portion of a ride height of the vehicle. For example, responsive to determining that the side impact is imminent, the safety system 426 may transmit an instruction to the suspension system to raise or lower the ride height (e.g., the first ride height 612). Responsive to receiving the instruction from the safety system 426, for example, the suspension system may actuate one or more components (e.g., pump, strut actuator(s), etc.) for causing the ride height of the vehicle 402 to adjust. Adjusting the ride height may, in some instances, depend on characteristic(s) of the vehicle 402 (e.g., current ride height, direction, speed, bearing, etc.) and/or the object (e.g., a size of the object, a volume of the object, a ride height of the object). Additionally, determining whether to adjust the ride height, as well as how much to adjust the ride height, may be based at least in part on the classification of the object (e.g., car, truck, bus, etc.). For example, as shown in FIG. 6, the vehicle 402 may increase the first ride height 612 to a second ride height 616. The second ride height 616 may be greater than the first ride height 612 and the second ride height 616 may be determined in a similar way as the first ride height 612. As such, responsive to receiving a signal indicating a side impact with the object, the suspension system may cause one or more strut(s) to raise to increase the ride height. As discussed herein, adjusting the first ride height 612 to the second ride height 616 may align the frame or safety structure the vehicle 402 with that of the object.

In some instances, adjusting the ride height may include adjusting one or more strut(s) positioned at ends or sides of the vehicle 402, via respective suspension systems of the vehicle 402. For example, strut(s) positioned at different corners of the vehicle 402 may be actuated to various lengths to achieve different roll and pitches. In some instances, this may be accomplished by actuating strut(s) of a first suspension system located at the front of the vehicle 402 and actuating strut(s) of a second suspension system located at the rear of the vehicle 402.

EXAMPLE CLAUSES

The following paragraphs describe various examples. Any of the examples in this section may be used with any other of the examples in this section and/or any of the other examples or embodiments described herein.

A: A vehicle comprising: a suspension system; a sensor; a processor; and non-transitory computer-readable media storing computer-executable instructions that, when executed by the processor, cause the vehicle to perform operations comprising: receiving data captured by the sensor, the data representing at least a portion of an environment of the vehicle; detecting, based at least in part on the data, an object within the environment; determining a probability associated with a collision between the vehicle and the object, wherein the probability is determined based at least in part on a first trajectory associated with the vehicle and a second trajectory associated with the object; determining that the probability meets or exceeds a threshold probability; determining an impact location on the vehicle associated with the collision; determining, based at least in part on the probability meeting or exceeding the threshold probability and the impact location, a mitigating action to be performed by the vehicle, wherein the mitigating action includes adjusting a hydraulic fluid pressure within the suspension system; and causing the mitigating action to be performed.

B: The vehicle of paragraph A, the operations further comprising: determining that the collision occurred; determining a second mitigating action performable by the vehicle after the collision; and causing the second mitigating action to be performed.

C: The vehicle of paragraph A or B, wherein: the suspension system comprises a first strut, a second strut, a pump, a fluid reservoir, an accumulator, and a dump valve in fluid connection; and the mitigating action and the second mitigating action each comprise at least one of: turning off the pump to depressurize the accumulator such that hydraulic fluid empties into the fluid reservoir; opening a dump valve to depressurize the accumulator while maintaining pressure in the first strut and the second strut; or opening a release valve of the accumulator to release a pressurized gas stored within the accumulator.

D: A method comprising: receiving sensor data captured by a sensor associated with a vehicle and an environment; determining that the sensor data represents an object in the environment; determining a collision probability associated with a probability of collision between the vehicle and the object; determining, based at least in part on the collision probability, a mitigating action performable by the vehicle, wherein the mitigating action is associated with adjusting a hydraulic fluid pressure in at least a portion of a hydraulic fluid system of the vehicle; and causing the mitigating action to be performed.

E: The method of paragraph D, wherein the mitigating action comprises at least one of: turning off a pump to an accumulator of the hydraulic fluid system; opening a valve to relieve pressure within the hydraulic fluid system to drain hydraulic fluid into a fluid reservoir; or evacuating a pressurized gas from the accumulator.

F: The method of paragraph D or E, wherein the hydraulic fluid system comprises a suspension system of the vehicle.

G: The method of any of paragraphs D-F, wherein the mitigating is a first mitigating action at least partially performed by the vehicle prior to the collision, the method further comprising: determining that the collision occurred between the vehicle and the object; determining a second mitigating action performable by the vehicle after the collision, the second mitigating action being different than the first mitigating action; and causing the second mitigating action to be performed.

H: The method of any of paragraphs D-G, wherein: the first mitigating action comprises one of: turning off a pump to an accumulator of the hydraulic fluid system; or opening a valve to relieve pressure within the hydraulic fluid system to drain hydraulic fluid into a fluid reservoir; and the second mitigating action comprises at least one of: opening a release valve of the accumulator to evacuate a pressurized gas within the accumulator; or opening the valve to drain the hydraulic fluid into the fluid reservoir.

I: The method of any of paragraphs D-H, further comprising: receiving an indication from a second sensor associated with the vehicle; and determining, based at least in part on the indication, that the collision occurred.

J: The method of any of paragraphs D-I, further comprising determining that the collision probability meets or exceeds a threshold probability, and wherein causing the mitigating action to be performed is based at least in part on the collision probability meeting or exceeding the threshold probability.

K: The method of any of paragraphs D-J, further comprising determining a predicted impact location of the object on the vehicle, and wherein determining the mitigating action is further based at least in part on the predicted impact location.

L: The method of any of paragraphs D-K, further comprising: determining, based at least in part on the collision probability, an absence of a collision; and causing, in response to determining the absence of the collision, the hydraulic fluid pressure within the hydraulic fluid system to increase.

M: The method of any of paragraphs D-L, wherein the hydraulic fluid system is located at a first longitudinal end of the vehicle a second hydraulic fluid system is located at second longitudinal end of the vehicle opposite the first longitudinal end, further comprising: determining that a predicted impact location associated with the collision is at the first longitudinal end of the vehicle; and refraining from reducing a second hydraulic fluid pressure in at least a portion of the second hydraulic fluid system.

N: The method of any of paragraphs D-M, further comprising determining a predicted time associated with the collision, and wherein determining the mitigating action is based at least in part on the predicted time.

O: One or more non-transitory computer-readable media storing instructions executable by a processor, wherein the instructions, when executed, cause the processor to perform operations comprising: receiving sensor data captured by a sensor associated with a vehicle and an environment; determining that the sensor data represents an object in the environment; determining a collision probability associated with a probability of collision between the vehicle and the object; determining, based at least in part on the collision probability, a mitigating action performable by the vehicle, wherein the mitigating action is associated with adjusting a hydraulic fluid pressure in at least a portion of a hydraulic fluid system of the vehicle; and causing the mitigating action to be performed.

P: The one or more non-transitory computer-readable media of paragraph O, the operations further comprising determining that the collision probability meets or exceeds a threshold probability, and wherein causing the mitigating action to be performed is based at least in part on the collision probability meeting or exceeding the threshold probability.

Q: The one or more non-transitory computer-readable media of paragraph O or P, wherein the mitigating action comprises at least one of: turning off a pump to an accumulator of the hydraulic fluid system; opening a valve to relieve pressure within the hydraulic fluid system and to drain hydraulic fluid into a fluid reservoir; or evacuating a pressurized gas from the accumulator.

R: The one or more non-transitory computer-readable media of any of paragraphs O-Q, the operations further comprising determining a predicted impact location of the object on the vehicle, and wherein determining the mitigating action is further based at least in part on the predicted impact location.

S: The one or more non-transitory computer-readable media of any of paragraphs O-R, wherein the mitigating action is at least partially performed by the vehicle prior to the collision, the operations further comprising: determining that the collision occurred between the vehicle and the object; determining a second mitigating action performable by the vehicle after the collision, the second mitigating action being different than the mitigating action; and causing the second mitigating action to be performed.

T: The one or more non-transitory computer-readable media of any of paragraphs O-S, the operations further comprising: determining, based at least in part on the collision probability, an absence of a collision; and causing, in response to determining the absence of the collision, the hydraulic fluid pressure within the hydraulic fluid system to increase.

While the example clauses described above are described with respect to one particular implementation, it should be understood that, in the context of this document, the content of the example clauses can also be implemented via a method, device, system, computer-readable medium, and/or another implementation.

Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
   a suspension system including a strut, a fluid reservoir, an accumulator, a first valve, and a second valve in fluid connection;
   a sensor;
   a processor; and
   non-transitory computer-readable media storing computer-executable instructions that, when executed by the processor, cause the vehicle to perform operations comprising:
      receiving data captured by the sensor, the data representing at least a portion of an environment of the vehicle;
      detecting, based at least in part on the data, an object within the environment;
      determining a probability associated with a collision between the vehicle and the object, wherein the probability is determined based at least in part on a first trajectory associated with the vehicle and a second trajectory associated with the object;

determining that the probability meets or exceeds a threshold probability;

determining an impact location on the vehicle associated with the collision;

determining, based at least in part on the probability meeting or exceeding the threshold probability and the impact location, a first mitigating action to be performed by the vehicle, wherein the first mitigating action includes opening the first valve to route hydraulic fluid from the accumulator to the fluid reservoir, wherein routing the hydraulic fluid from the accumulator to the fluid reservoir maintains a pressure of the hydraulic fluid in the strut;

causing the first mitigating action to be performed;

determining that the collision occurred;

determining, based at least in part on the collision occurring, a second mitigating action to be performed by the vehicle, wherein the second mitigating action includes opening the second valve to release a pressurized gas within the accumulator to reduce the pressure of the hydraulic fluid in the strut; and causing the second mitigating action to be performed.

2. The vehicle of claim 1, wherein the suspension system further comprises a pump, and wherein one of the first mitigating action or the second mitigating action comprises turning off the pump to depressurize the accumulator such that the hydraulic fluid empties into the fluid reservoir.

3. The vehicle of claim 1, wherein the vehicle comprises a bi-directional vehicle, and wherein at least one of the first mitigating action or the second mitigating action is based at least in part on a direction of travel of the bi-directional vehicle.

4. A method comprising:
receiving sensor data captured by a sensor associated with a vehicle and an environment;
determining that the sensor data represents an object in the environment;
determining a collision probability associated with a probability of collision between the vehicle and the object;
determining, based at least in part on the collision probability, a first mitigating action performable by the vehicle, wherein the first mitigating action is associated with adjusting a hydraulic fluid pressure in at least a first portion of a hydraulic fluid system of the vehicle;
causing the first mitigating action to be performed;
determining that the collision occurred;
determining, based at least in part on the collision occurring, a second mitigating action to be performed by the vehicle, wherein the second mitigating action includes at least one of turning off a pump or opening a valve to reduce the hydraulic fluid pressure within at least the first portion or a second portion of the hydraulic fluid system to prevent hydraulic fluid being sprayed into the environment; and
causing the second mitigating action to be performed.

5. The method of claim 4, wherein:
the pump supplies the hydraulic fluid to an accumulator of the hydraulic fluid system;
the first mitigating action comprises at least one of:
turning off the pump,
opening the valve to evacuate a pressurized gas from the accumulator,
opening a second valve to relieve pressure within the hydraulic fluid system to drain the hydraulic fluid into a fluid reservoir, or
evacuating a pressurized gas from the accumulator; and
the second mitigating action comprises a different one of turning off the pump, opening the valve, or opening the second valve.

6. The method of claim 4, wherein the hydraulic fluid system comprises a suspension system of the vehicle.

7. The method of claim 4, further comprising:
receiving an indication from a second sensor associated with the vehicle; and
determining, based at least in part on the indication, that the collision occurred.

8. The method of claim 4, further comprising determining that the collision probability meets or exceeds a threshold probability, and wherein causing the first mitigating action to be performed is based at least in part on the collision probability meeting or exceeding the threshold probability.

9. The method of claim 4, wherein the hydraulic fluid system is located at a first longitudinal end of the vehicle a second hydraulic fluid system is located at second longitudinal end of the vehicle opposite the first longitudinal end, further comprising:
determining that a predicted impact location associated with the collision is at the first longitudinal end of the vehicle; and
refraining from reducing a second hydraulic fluid pressure in at least a portion of the second hydraulic fluid system.

10. The method of claim 4, further comprising determining a predicted time associated with the collision, and wherein determining the first mitigating action is based at least in part on the predicted time.

11. The method of claim 4, further comprising determining a characteristic of the object, the characteristic comprising at least one of:
a size of the object,
a shape of the object,
a speed of the object,
a height of a leading surface of the object, or
a type of the object,
wherein adjusting the hydraulic fluid pressure in at least the first portion of the hydraulic fluid system is further based at least in part on the characteristic.

12. The method of claim 4, wherein the first mitigating action adjusts a ride height of the vehicle to substantially align a frame or a safety structure of the vehicle with a surface of the object.

13. The method of claim 4, further comprising:
determining a predicted impact location of the object on the vehicle; and
determining an impact location of the object on the vehicle, and
wherein determining the first mitigating action is based at least in part on the predicted impact location,
wherein the second mitigating action is further based at least in part on the impact location.

14. The method of claim 4, further comprising determining an impact location of the object on the vehicle, and wherein determining the second mitigating action is based at least in part on the impact location.

15. The method of claim 4, wherein:
the first mitigating action includes opening a second valve to route the hydraulic fluid from an accumulator to a fluid reservoir to maintain a pressure of the hydraulic fluid in a strut; and
the second mitigating action includes at least one of:
opening the valve to release a pressurized gas within the accumulator to reduce the pressure of the hydraulic fluid in the strut, or turning off the pump to reduce the hydraulic fluid pressure within at least the first portion or the second portion.

16. One or more non-transitory computer-readable media storing instructions executable by a processor, wherein the instructions, when executed, cause the processor to perform operations comprising:
receiving sensor data captured by a sensor associated with a vehicle and an environment;
determining that the sensor data represents an object in the environment;
determining a collision probability associated with a probability of collision between the vehicle and the object;
determining, based at least in part on the collision probability, a first mitigating action performable by the vehicle, wherein the first mitigating action is associated with adjusting a hydraulic fluid pressure in at least a portion of a hydraulic fluid system of the vehicle;
causing the first mitigating action to be performed;
determining that the collision occurred between the vehicle and the object;
determining a second mitigating action performable by the vehicle after the collision, wherein the second mitigating action is associated with depressurizing the hydraulic fluid system to prevent a spraying of the hydraulic fluid from the hydraulic fluid system; and
causing the second mitigating action to be performed.

17. The one or more non-transitory computer-readable media of claim 16, the operations further comprising determining that the collision probability meets or exceeds a threshold probability, and wherein causing the first mitigating action to be performed is based at least in part on the collision probability meeting or exceeding the threshold probability.

18. The one or more non-transitory computer-readable media of claim 16, wherein at least one of the first mitigating action or the second mitigating action comprises at least one of:
turning off a pump to an accumulator of the hydraulic fluid system;
opening a valve to relieve pressure within the hydraulic fluid system and to drain the hydraulic fluid into a fluid reservoir; or
evacuating a pressurized gas from the accumulator.

19. The one or more non-transitory computer-readable media of claim 16, the operations further comprising determining a predicted impact location of the object on the vehicle, and wherein determining the first mitigating action is further based at least in part on the predicted impact location.

20. The one or more non-transitory computer-readable media of claim 16, wherein:
the first mitigating action maintains a ride height of the vehicle; and
the second mitigating action adjusts the ride height of the vehicle.

* * * * *